United States Patent

Garman

[19]

[11] Patent Number: 5,926,822
[45] Date of Patent: Jul. 20, 1999

[54] TRANSFORMATION OF REAL TIME DATA INTO TIMES SERIES AND FILTERED REAL TIME DATA WITHIN A SPREADSHEET APPLICATION

[75] Inventor: Mark B. Garman, Orinda, Calif.

[73] Assignee: Financial Engineering Associates, Inc., Berkeley, Calif.

[21] Appl. No.: 08/709,101

[22] Filed: Sep. 6, 1996

[51] Int. Cl.⁶ .................................................. G06F 17/30
[52] U.S. Cl. .................... 707/503; 707/504; 707/500; 707/104
[58] Field of Search .................................. 707/503, 504, 707/500, 100, 104

[56] References Cited

U.S. PATENT DOCUMENTS

| | | | |
|---|---|---|---|
| 5,038,318 | 8/1991 | Roseman | 395/800.3 |
| 5,276,607 | 1/1994 | Harris et al. | 345/467 |
| 5,293,615 | 3/1994 | Amada | 707/4 |
| 5,381,470 | 1/1995 | Cambray et al. | 379/216 |
| 5,471,575 | 11/1995 | Giansante | 707/503 |
| 5,604,854 | 2/1997 | Glassey | 707/503 |

OTHER PUBLICATIONS

William H. Greene, Econometric Analysis, second edition Pretice–Hall, pp. 568–570, Jan. 1990.

*Primary Examiner*—Paul V. Kulik
*Assistant Examiner*—Greta L. Robinson
*Attorney, Agent, or Firm*—Fenwick & West LLP

[57] ABSTRACT

A spreadsheet application includes functions and data structures for transforming real time data items individually received over time from a real time data source into time series data globally available within the spreadsheet environment. The spreadsheet application includes a tape function operating in conjunction with a plurality of tape data structures, to store real time data items received over individually over time from a real time data source into one of the tape data structures, thereby persistently storing a set of previously received real time data items in a manner that is accessible to other functions of the spreadsheet. A plurality of filter functions and filter data structures enable computation of various statistical measures on real time data items by storing in globally accessible filter data structures information derived from a sequence of real time data items, such as a previously computed filter output, latency information describing the time intervals between real time data items, and other data, to allow the computation of a current filter output without storing all previously received real time data items. The filter and tape functions allow for various uses of real time data items without the need to provide complex macro programming.

16 Claims, 5 Drawing Sheets

| TIME VALUE | RTDI 1 | RTDI 2 |
|---|---|---|
| 15 | 0.100863 | 93 |
| 11 | 0.030365 | 39 |
| 7 | 0.081893 | 85 |
| 4 | 0.123988 | 12 |
| 1 | 0.071187 | 15 |

T(1) → first row; T(5) → last row; S(1,1) - S(1,2) ← first row; S(5,1) - S(5,2) ← last row

FIG. 5a

| TIME VALUE | RTDI 1 | RTDI 2 |
|---|---|---|
| 18 | 0.102196 | 9 |
| 15 | 0.100863 | 93 |
| 11 | 0.030365 | 39 |
| 7 | 0.081893 | 85 |
| 4 | 0.123988 | 12 |

FIG. 5b

TRANSFORMATION OF REAL TIME DATA INTO TIMES SERIES AND FILTERED REAL TIME DATA WITHIN A SPREADSHEET APPLICATION

BACKGROUND

1. Field of Invention

The present invention relates to systems and methods for manipulation of real time data, and more particularly, to systems and methods for manipulation of real time data in a spreadsheet.

2. Background of Invention

A spreadsheet application provides an environment where formulas may be entered manually into tabular arrays by the user to define various functions, totals, databases, and graphs. One common usage of spreadsheet applications is to store and operate on time series data. Such operations typically include graphing, computing averages, standard deviations, or other statistical measures. In order to do this, conventional spreadsheets generally need all of the data that define the time series to be present in the spreadsheet.

By design, conventional spreadsheet applications operate on the current values of all variables stored in the spreadsheet's memory partition. Any time there is change in the value of a variable in a spreadsheet cell—for example by the user inputting a new value—the spreadsheet often recalculates the value of every cell that is effected by the change in value, and may recalculate all cells in the spreadsheet. Thus, for a given variable, the spreadsheet always, and only, operates on a current value of the variable, and conventional spreadsheets are not designed to operate on the historical values a variable or cell has had over time.

In a spreadsheet environment, it is now common to import and use real-time data items from external real time data sources. In particular, means are commonly provided to import "real time data items" ("RTDIs") into individual spreadsheet cells, such RTDIs frequently being numeric data generated by an external physical process. In general, such RTDIs appear within spreadsheets as simple numeric values which change from time to time. These data items are "real-time," in the sense that they reflect the almost-current state of the process which they attempt to describe.

For example, for spreadsheet users concerned with financial markets, RTDIs specifying prices or interest rates describing various markets are typically imported by reference into a spreadsheet cell from an external computer program that is linked over a computer network to a computer system providing the real time information. In manufacturing process control, the RTDI might involve numerical data specifying the changing position of a tool part, the temperature of a liquid, or the air speed in a wind tunnel. Further, real-time calculations applied to an RTDI may yield other RTDIs, for example, squaring the value of an RTDI, or converting a temperature from Fahrenheit to Celsius, and these results also be further cascaded to yield other RTDIs.

In general then, RTDIs are time dependent data values that are generated in or near real time by some source external to the spreadsheet application. These RTDIs are then imported into a cell of a spreadsheet, and form the basis of some calculation or graph. As noted, conventional spreadsheets update themselves each time the value of cell changes, and only store the current value of a cell. Where a RTDI is imported into a single cell, the spreadsheet will replace the previous value of the RTDI stored in the cell. Any previous value of the RTDI is effectively lost each time a new RTDI is received.

This limitation of conventional spreadsheets is not always desirable. In order to compute various statistical measures on a sequence of RTDIs, or to plot the sequence over time, it is instead desirable to store and use prior values of an RTDI in addition to its current value, in the form of time series data or other reduced formats of data.

For example, suppose that the user desires to compute the time-averaged value of an RTDI. In this case, the current value of the RTDI is insufficient information to compute the desired result. In addition to the current value of the RTDI, there must also be available to the spreadsheet application either (A) all of the prior RTDI values and the times at which these appeared, or (B) sufficient summary information derived from such prior values which permits the desired quantity to be computed on the basis of this summary information, the last-computation time, and the current time and the current value of the RTDI. The former technique above is termed herein the "time-series" strategy, since it employs a full sequence of (time, data value(s)) tuples upon which to base the computation of the desired quantity. The latter approach is termed the "incremental" strategy herein since it exploits the specific computational structure of the desired quantity to reduce the amount of information which is required to complete the computation. Thus, in the current example, when computing the time-averaged value of the RTDI, it is sufficient in the incremental strategy to employ solely the previously computed average, the time it was last computed, the current value of the RTDI, and the current time. Accordingly, if only the current value of the RTDI is available, and no other data about the previous values is available, then it is impossible to compute a time dependent value or plot the changes in the RTDI over time without further mechanisms.

Within the spreadsheet environment, the standard state of the art for carrying out the time-series strategy is to create a complex and individually-designed macro command which organizes and displays the RTDI sequence, invoked upon each new RTDI received into the spreadsheet application. This approach however leaves it up to the individual user to program the macro, a non-trivial task for most users. Moreover, this approach, because it relies on the spreadsheet to interpret and execute a macro, results in relatively slow operation, and is unsuitable for complex computations which require fast computation. Also, because there are many different types of functions for which time series computations are desired—averages, volatility, standard deviations, drift to name a few—the user would have to individually program each desired function separately, a time consuming and burdensome task, and one beyond the capability of most spreadsheet users.

There are generally also no standard means for the incremental strategy, and in this case as well a new and complex macro would normally be individually designed for each specific incremental calculation desired.

Accordingly, it is desirable to provide within a spreadsheet application, functions and data structures that can store and manipulate real time data items into time series data, enabling the spreadsheet application to receive and store RTDIs as time series data, and to compute various filtering functions on such RTDIs.

SUMMARY OF THE INVENTION

In accordance with one aspect of the present invention, there is provided a spreadsheet application that provides for the storage and processing of real time data items received over time from an external real time data source. In one aspect, the spreadsheet application includes a tape function and a tape data structure. The tape function receives the real time data values from the external real time data source individually over time. The tape function then stores these values into a tape data structure which is stored in the memory along with the spreadsheet application, and thereby accessible to the spreadsheet application and its functions. The tape data structure stores the data values in the order in which they are received by the tape function from the real time data source.

The tape data structure may operate to limit the amount of real time data it stores. This may be done by having the tape data structure store up to N data values. Once the N data values are stored, each time a new real time data value is received, the $N^{th}$ oldest data value is removed from the tape data structure. In one implementation, this may be done with a tape data structure having N storage locations $S_N$, and then shifting, via the tape function, each real time data value in storage location $S_j$ to storage location $S_{j-1}$ for $1 \leq j \leq N-1$, thereby overwriting, the very last real time data value stored in the tape data structure. The newly received real time data is then stored to $S_1$. This implementation usefully constrains the tape data structure to a fixed size, enabling it to be readily manipulated by other functions of the spreadsheet without any complex programming.

More particularly, the tape data structure may be defined as an array with N tuples. Each tuple includes a time value, such as a system time stamp, and a set of one or more real time data items associated with the time value. Thus, in this embodiment, the real time data source provides at each time value some number of real time data items which are stored by the tape function to the tape data structure.

One of the benefits of the tape data structure is that it need not be visible or present in the spreadsheet itself to be used. Instead, there may be provided a number of independent tape data structures, each one identified by a tape number. The user then specifies a tape data structure by referencing the tape number in the interface of the tape function. In this manner, only a single cell is used to refer to the tape data structure, even though the tape data structure may store hundreds of real time data items. This approach contrasts with conventional spreadsheet design which typically requires time series data to be defined in a range of cells of the spreadsheet itself. That is, spreadsheets do not typically allow for global data other than data defined in the spreadsheet. The tape data structure overcomes this limitation by providing for a global data structure that may be referenced from within the spreadsheet, but that does not have to occupy a significant number, or perhaps any, of the available spreadsheet cells.

The tape function and tape data structure thus provide for the capture and storage of real time data, and thereby its transformation from real time data into time series data. In this form, such data can then be used by any other function of the spreadsheet application. For example, the real time data may be readily plotted or graphed to show variations over time. Because the real time data is continually received and stored to the tape data structure, and because spreadsheets are designed to recalculate and redisplay in response to each update of its data, such a graph of real time data would be continually updated, with no further intervention or programming by the user. Thus, the user can easily define a graph of the real time data using the tape data structure and real time data as the source of the data for the graph, and thereafter simply observe the changes in the real time data over time. Similarly, the user can define a variable as the output of a computation based on the series of RTDIs in the tape data structure. This value would be recomputed each time a new real time data item is received. Thus, the tape data structure and tape function enable the efficient implementation of the time-series approach discussed above.

Because the tape function and data structure are part of the spreadsheet application, they do not require the user to program a macro to achieve the desired functionality. Also, as part of the spreadsheet application, the tape function executes very rapidly.

In another aspect, the present invention provides a plurality of filter functions and filter data structures, which implement the incremental strategy of time series analysis described above. The filter functions each receive a plurality of real time data values individually over time from a real time data source and computes a filter output based on the currently received RTDI and a previous filter output computed at a previous time. The filter function stores the filter output into a filter data structure, thereby allowing the filter function to continually recompute the filter output based on the previous filter output. The filter function also stores to the filter data structure any other auxiliary data needed to compute the filter output, such as the time of the currently received data item.

While they are conceptually related to the tape data structure and function, the filter data structure and functions provide further convenience by reducing the size and memory requirements required to produce the relevant computations. That is, the filter functions take advantage of the special character of the filter computations, employing the incremental calculation form of the function instead of a time series form. For example, using a time series approach to calculate the average value of a series of RTDIs requires storing the entire series of RTDIs:

$$A_N = \frac{1}{N} \sum_{n=1}^{N} x_n \qquad \text{Eq. 1}$$

where $x_n$ is the $n^{th}$ RTDI. This approach requires a significant amount of memory, since the series may have thousands of data items, each of which would have to be stored. On the other hand, the incremental method, as embodied in an average filter function, separates the average computation into two parts:

$$A_N = \frac{1}{N} x_n + \left(1 - \frac{1}{N}\right) A_{N-1} \qquad \text{Eq. 2}$$

so that the new average is simply a weighted combination of the currently received RTDI value $x_n$ and the previously computed average $A_{N-1}$. Thus only these two items need to be stored in the filter data structure. This allows the filter function to operate within the spreadsheet application continually over time on a sequence of RTDIs received from the real time data source, without exceeding the memory allocation or computational limitations of the spreadsheet application itself. All filter functions and data structures have similar separations of computation components, and thereby provide considerable savings in memory and performance.

Any number of filter functions may be included in the spreadsheet application. These filter functions may include various types of averages, such as weighted or unweighted averages, standard deviations, drift and volatility functions, maximum, minimum, trim, count, sign or other statistical computations. To allow for multiple different filter functions to be independently used within a spreadsheet, there is provided a plurality a filter data structures, each of which is referenced by a distinct filter number. The filter number is used within the function call or interface for a filter function, and specifies the filter data structure. The filter data structure may be structured as the union of a plurality of distinct data types to accommodate the specific data needed by each of the different types of filter functions.

In another aspect of the invention, there are provided methods for operating a spreadsheet application to receive and process RTDIs from a real time data source, to transform such data into time series data or other reduced formatted summary data, as used in incremental calculations of filters.

The tape and filter functions obviate the need for macro programming as related to computations which require prior, as well as current, RTDI values. Two other benefits are also provided by these functions and structures. First, the tape function generally makes dynamic graphs available within spreadsheets, using nothing more than the standard spreadsheet graphing capability. Second, the filter functions make complex statistical calculations on RTDIs available in their incremental form, and thus extremely easy to use, without any user spreadsheet programming. Using the current invention, virtually all of the dynamic graphing capabilities (dynamic re-scaling, updating, etc.) are thereupon made available in a spreadsheet application such as Microsoft Corp.'s Excel™ spreadsheet via the tape data structure and tape function.

BRIEF DESCRIPTION OF THE DRAWINGS

FIGS. 5a and 5b are illustrations of a tape data structure in use.

DETAILED DESCRIPTION OF THE INVENTION

Figure 1:
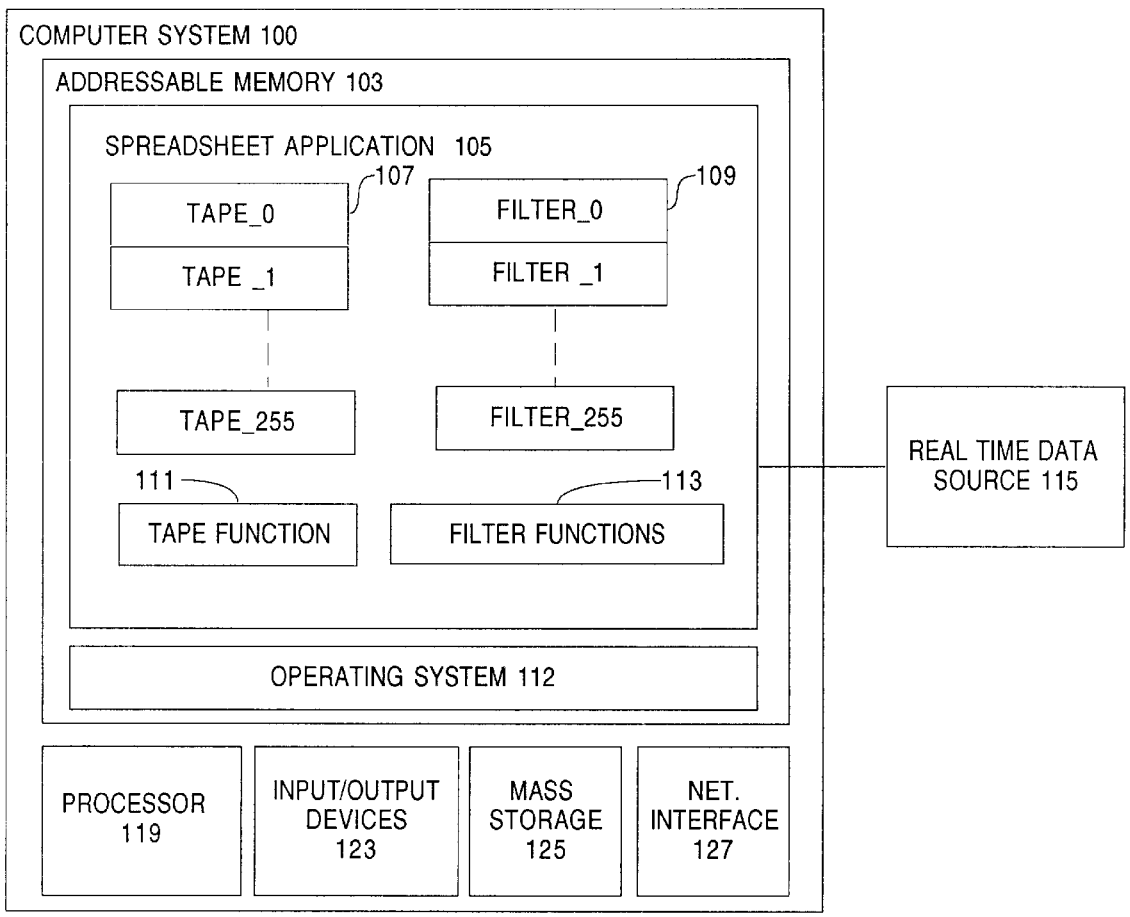
FIG. 1 is an illustration of a system including a spreadsheet application according to the present invention.

Referring now to FIG. 1, there is shown the software organization of one embodiment of a computer system in accordance with the present invention. Computer 100 is generally a conventional computer including an addressable memory 103, and a processor 119, along with conventional input (e.g. keyboard and mouse) and output (e.g. display and printers) devices 123, a hard disk or other mass storage unit 125, and a communications or network interface 127. The processor 119 is conventional, such as a Intel Pentium® processor. The computer system 100 may be implemented with conventional hardware, such as an IBM compatible, Intel Pentium® based computer.

Loaded into and executing from the memory 103 is a spreadsheet application 105 modified in accordance with the present invention. Within the memory partition set aside for the spreadsheet application 105 there is stored any useful number of tape data structures 107 and filter data structures 109. In the preferred embodiment there are 256 tape data structures 107 and 256 filter data structures 109, though any other number may be used, and differing numbers of filter and tape data structures may also be used. A tape function 111 operates on any of the tape data structures 107 to store real time data items (RTDIs) thereto as received from the external real time data source 115. A number of filter functions 113 each operate on any of the filter data structures 109 to process RTDIs received from the real time data source 115. The real time data source 115 is communicatively coupled to the computer 100 over a conventional network, such as the Internet, Telnet or the like via the network interface 127 or other suitable communications mechanism. The real time data source 115 may be referenced in one or more cells of the spreadsheet in a conventional manner. Exemplary real time data sources 115 include manufacturing processes (e.g. process parameters; material positions, temperatures, volumes, density), financial information services (e.g. stock prices, interest rates, currency exchange rates) and any other source of time dependent variable data. By way of example, real time data source 115 are delivered to Microsoft Corp.'s Excel™ spreadsheet application by means of Microsoft DDE (dynamic data exchange) mechanism, possibly through a network communication link 127.

Also loaded into and executing from the addressable memory 103 is a conventional operating system 112, such as Microsoft Corp.'s Windows 3.1, Windows95, or Windows NT operating systems.

In one embodiment of the present invention, the tape data structures 107, filter data structures 109, tape function 111, and filter functions 113, are provided as native components of the spreadsheet application 105, as provided by the software manufacturer of the spreadsheet application 105. Alternatively, these structures and functions may be implemented as "add-in" functions to be used with an existing spreadsheet application, through conventional add-in technology. The add-in approach allows users to keep their existing spreadsheet application, and extend its functionality merely by employing add-in functions incorporating the tape and filter functions and data structures. An add-in function differs from an ordinary application inasmuch as there is no control over the time at which the program thread encounters the add-in code, and all control must be exercised at either (a) the add-in bind time—the time at which the add-in is linked into the spreadsheet application 105, (b) the filter/tape function run time, or (c) the add-in unbind time. Whether implemented natively or as add-in function, the present invention requires no additional macro programming by the user, is much faster to compute than macros, and is much simpler to use.

Generally, the tape data structure 107 provides a global data storage within the spreadsheet environment for a plurality of RTDIs, but such real time data does not necessarily appear in the spreadsheet cells. A tape function 111 operates upon a current RTDI received from the real time data source 115, recording the values of the RTDI as they are received in order from the real time data source 115, and the times at which these RTDIs are received by the spreadsheet application 105, or alternatively are generated by the real time data source 115 and sent to the spreadsheet application 105. At each time value there may be one or more RTDIs received from the real time data source 115, and thus the tape data structure 107 be implemented to support any useful number of RTDIs at each time value. Where multiple RTDIs are associated with each time value, the tape data structure 107 is conveniently referred to as a "multi-tape."

Figure 2:
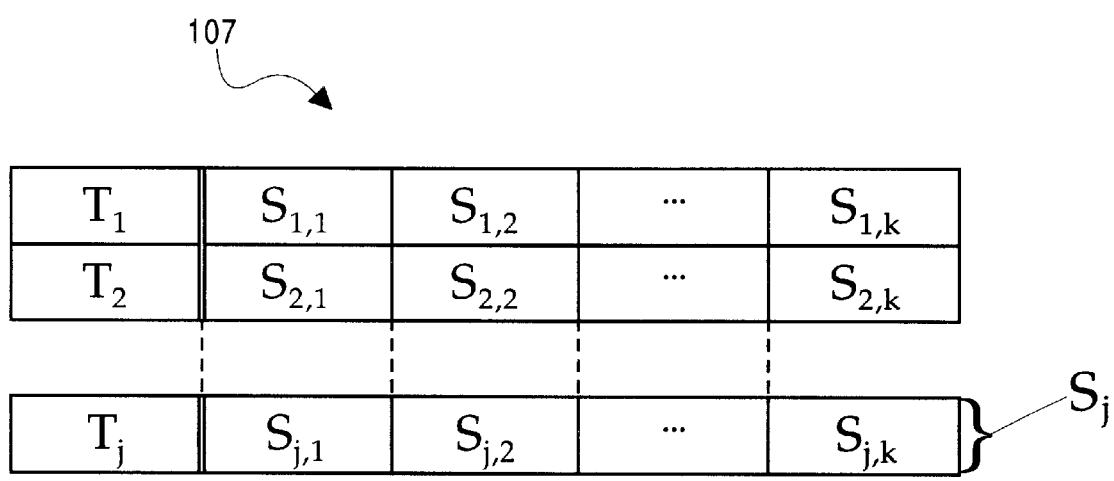
FIG. 2 is an illustration of a tape data structure.

Referring now to FIG. 2, there is shown an illustration of a tape data structure 107 in one embodiment of the present invention. The tape data structure 107 is an array of tuples $[T_j, S_j]$ where for all j, $1 \leq j \leq N$, $T_j$ is a time value and $S_j = \{S_{j,1}, S_{j,2}, \ldots S_{jk}\}$ is an ordered set of RTDIs for k>0. N defines the maximum number of sets of RTDIs that are stored in the tape data structure 107. N may be predetermined by the manufacturer of the spreadsheet application 105 or add-in functions, or may be established by the user. Each set $S_j$ of RTDIs is associated with one or more storage location(s) in memory 103 for the tape data structure 107. Typically, the tape data structure 107 will be allocated in the application heap area reserved for the spreadsheet application 105. When loaded, the spreadsheet application 105 establishes particular areas of its memory partition for its executable code and for the tape data structures 107 and the filter data structures 109, and stores the necessary information for the filter and tape functions to access such structures.

In the preferred embodiment, each tape data structure holds up to 256 tuples of data. For a simple tape data structure 107 used to track the value of a single RTDI at each time value, there is only a single element in each set $S_j$. For more complex applications, tracking multiple RTDIs at each time value—e.g. the (x,y,z) position of a machine tool—there may be multiple items in $S_j$, as illustrated in FIG. 2. The time value $T_j$ may be implemented as a system timestamp with date and time data, or merely time data only if appropriate for the application. The data type of real time data items in $S_j$ may be real numbers, integers, strings, extended numerical types, or any other data type being supplied by the real time data source 115.

A C-style pseudo code declaration for an implementation of a tape data structure 107, where k=3 and N=100 is as follows:

```
define    MAXSIZE (100);       /*size of a tape*/
define    MAXNUM (256);        /*number of tapes*/
typedef   struct {
    time_t    t;               /*system time*/
    double    s1;              /*first RTDI*/
    double    s2;              /*second RTDI*/
    double    s3;              /*third RTDI*/
} TAPE_ELEMENT;                /*a tape tuple*/
typedef   struct {
    int   size;                /*size (N) of tape*/
    int   front;               /*index for first element*/
    int   back;                /*index for last element*/
    TAPE_ELEMENT element [MAXSIZE];
                               /*array of tuples S(j)*/
} TAPE;                        /*tape data structure*/
TAPE thetapes [MAXNUM];        /declare a set of tapes*/
```

In a preferred circular-queue type of data structure, the front index defines the location of current RTDI, and the back index defines the location of the least recent, or oldest RTDI. The above data structure definition is but one example of a tape data structure 107, and those of skill in the art will be able to readily define other tape data structures 107 in accordance with the principles of the present invention.

As noted above, there may be a useful number of distinct tape data structures 107 provided in the memory partition of the spreadsheet application 105. This allows the user to use multiple different tape data structures 107 to track and manipulate various RTDIs from one or more real time data sources 115. Accordingly, each tape data structure 107 preferably has a tape number which uniquely identifies it, so that the user can properly reference a particular tape data structure 107 in order to store an RTDI thereto. The tape number is resolved by the tape function 111 to a memory location where the tape function 111 stores the RTDIs received from the real time data source 115. For example, using the above data structure definition, this is done by using the tape number as an index into the TAPE array.

The tape data structure 107 is used in conjunction with a tape function 111. The tape function 111 is executed by the spreadsheet application 105 in the same manner as conventional functions, that is, when recalculation of a cell containing the tape function 111 is required. The tape function 111 preferably has the following interface:

tape(tape_num, RT_ITEM, <optional parameters>)

tape_num is the unique reference number for the particular tape data structure 107 being used to store the RTDI. The parameter tape_num implements direct user referencing. Under direct user referencing, the user is given the obligation to directly reference the tape data structure to be used with the tape_num parameter, which selection provides a unique reference to a given tape amongst many possible tapes. It is preferable that each tape function 111 used in the open set of spreadsheet files reference a different tape number, even if the function use the same real time data source 115 for the RTDI, or are used in different spreadsheets. This prevents the RTDIs used in one tape function from corrupting the RTDIs used in another tape function call. RT_ITEM references a cell that contains the RTDI from the real time data source 115. As can be seen from the above syntax of the tape function 111, it is very easy to use the tape data structure 107 and function 111 in a spreadsheet, and requires no complex programming by the user as with conventional macros. The remaining optional parameters may modify the manner in which the function 111 calculates or returns results. For example, they may instruct that the time values not be returned, or that only various RTDIs in a multi-tape be returned, display the tape in reverse order, or other modifications or controls.

The underlying tape data structure 107 used in any tape function 111 need not be completely displayed in the spreadsheet itself. However, such as display of the RTDIs in the tape data structure is useful, for example, for defining a range of data to be used for other functions, and for graphing the RTDIs over time. Thus, a range of cells may be defined in the spreadsheet as the output of a tape function 111 and particular tape data structure 107. When executed in a range of cells, the tape function 111 displays in each of the cells the RTDI value stored in one of the entries in the tape data structure 107 referenced in the tape function call. For example, if a range of ten cells is defined by a range formula:

={TAPE(1,PRICES)} where PRICES references a real time data source 115 of stock market prices for a particular security, and "1" references a first tape data structure 107 stored in memory 103 (e.g. TAPE[1] using the above tape structure definition), then the ten cells will respectively display the first ten entries in the tape data structure 107, and will show the changing values of the security price each time a new price is received from the real time data source 115. When the tape function 111 displays this data in this range of ten cells, it has the appearance of a "ticker tape" that automatically "scrolls" across the spreadsheet range as the RTDIs are received from the real time data source 115, visually appearing like a ticker tape seen in a stock broker's office.

Figure 3:
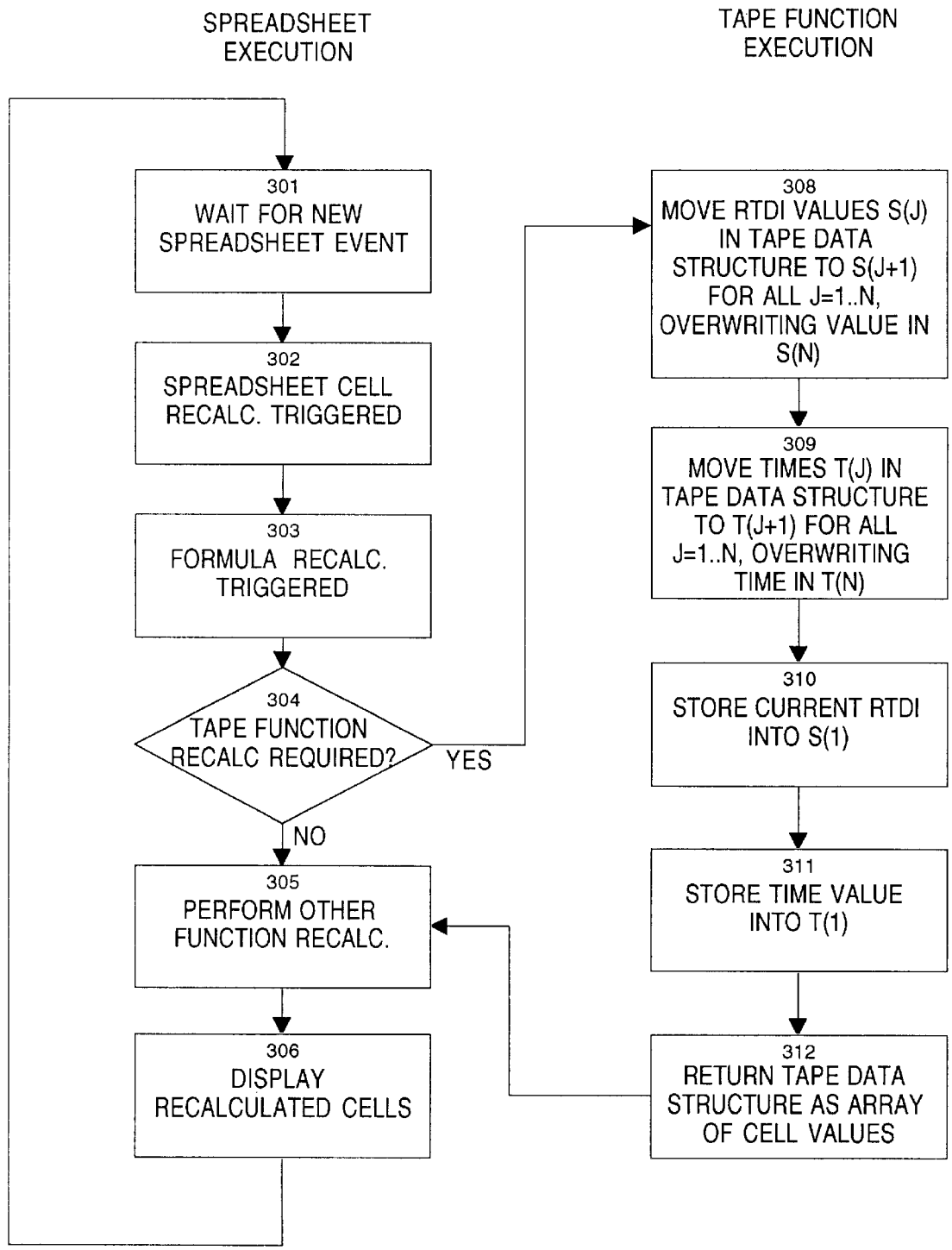
FIG. 3 is a flowgraph of the operation of the tape function.

Referring now to FIG. 3 there is shown a flowchart of the operation of the tape function 111 within the spreadsheet application 105. For the purposes of explaining FIG. 3, it is assumed that the user has created a spreadsheet in which a tape function 111 is used in at least one cell definition. Generally, spreadsheets are event driven, and execute recalculation of cells in response to changes in cell contents.

Thus, the spreadsheet application 105 waits 301 for a spreadsheet event, which in turn triggers 302 recalculation of a spreadsheet cell. Most spreadsheets will construct a tree of cell dependencies by which the spreadsheet application 105 determines whether a cell recalculation 302 is required, as not all cell include formulas dependent on the cells that have changed. Where a formula is to be recalculated 303, the spreadsheet application 105 determines 304 whether a tape function 111 is included in the formula to be recalculated. If not, then the spreadsheet application 105 performs any other function recalculation 305 that is necessary, and displays 306 the results of the recalculated cells, including updating any graphs or plots based on recalculated cells.

In the situation of interest, the spreadsheet event that triggers 302 recalculation is the receipt of a new RTDI from the real time data source 115. This RTDI may be disposed into a variety of uses, including here, storage in a tape data structure 107 via a tape function 111. Accordingly, when a cell is checked at 304, then if there is a tape function 111 that references the real time data source 115, this function will need to be recalculated.

The tape function 111 is called and executed. The tape function 111 determines which of the tape data structures 107 to operate through the tape number parameter specified in the interface of the tape function 111. The tape function 111 moves 308 all RTDIs in the tape data structure 107 by moving each RTDI in $S_j$ to $S_{j+1}$ for all $1 \leq j \leq N-1$. If there is an RTDI in $S_N$, then this RTDI is overwritten. The tape function 111 further moves 309 each time values $T_j$ into $T_{j+1}$ for all $1 \leq j \leq N-1$, overwriting the last time value at $T_N$. The tape function 111 stores 310 the currently received RTDI into $S_1$, and stores the current time value into $T_1$. As noted, each set $S_j$ may include any number of separate RTDIs associated with the particular time value $T_j$, and so the tape function 111 appropriately handles each of the underlying $S_{jk}$ RTDIs in $S_j$. Thus, the tape data structure 107 stores only the most recently received N RTDIs and their associated time values.

Once the tape data structure 107 is updated, the tape function 111 returns 312 the tape data structure 107 as an array of cell values to the spreadsheet application 105 for further handling, and if appropriate, display. This may include performing any other functions or graphs on the tape data structure where the results are referenced in some other function or graph definition. For example, if the tape data structure 107 is referenced in a graph definition for a graph of changing RTDI values over time, then the spreadsheet application 105 updates the graph with the current values in the tape data structure 107. Where the RTDIs are being received from the real time data source 115 in a relatively frequent manner (e.g. every few seconds) the spreadsheet application 105 will continually replot the graph, showing the real time changes in the underlying data.

FIGS. 5a and 5b illustrate a simple example of the tape data structure 107 and tape function 111. In FIG. 5a there is shown a tape data structure 107 defined to hold a maximum of five tuples of RTDIs and time values, each tuple being stored in a pair of storage locations $S_j=(S_{j,1}, S_{j,2})$ in the memory 103 for the spreadsheet application 105. In this example it is assumed that the tape data structure 107 has already received five such tuples of RTDIs, at times 1, 4, 7, 11, and 15 (for $T_1$ to $T_5$) respectively, as shown by the values in the storage locations $S_{1,1}$ to $S_{5,2}$ of the tape data structure 107. At time 18, a new tuple of RTDIs (0.102196, 9) arrives from the real time data source 115. The tape function 111, when executed by the spreadsheet application 105, moves each of the tuples in storage locations $(S_{j,1}, S_{j,2})$ of RTDI data to the next storage locations $(S_{j+1,1}, S_{j+1,2})$ of the tape data structure 107. The time value of (1) in $T_5$ and the RTDIs in $S_5$ are overwritten with the values from $T_4$ and $S_4$ respectively. The time value of (18) is stored to $T_1$ and the new RTDIs are stored in $S_1$, overwriting the previous values. Again, this data and behavior are entirely invisible to the user, occurring internally within a globally defined data structure. The user may decide to make this process visible by defining a range of spreadsheet cells to display the tape data structure 107, but this is not required; this ability to separate the actual underlying data structure from its cell instantiation enables the tape data structure 107 to be flexibly and easily implemented by the user in a variety of different usages, without imposing any complex programming requirements on the user.

The tape data structure 107 and tape function 111 thereby provide an easy to use mechanism for transforming real time data into time series data by implementing a time series approach to the data management, whereby historical values of a real time variable are stored in a global tape data structure accessible within the spreadsheet application through the tape function.

As discussed above, the time series approach is only one means for handling real time data as time series data. A second approach is the incremental approach, whereby summary information derived from the series of RTDIs is stored and repeatedly updated as new RTDIs are received. The present invention provides an implementation of this approach in the filter data structure 109 and the filter function 113. The filter data structure 109 provides for global storage of summary information derived from a sequence of received RTDIs including a currently received RTDI, and other auxiliary data, such as latency information describing the time elapsed between the current RTDI and the last received RTDI. From this global information the filter function 113 computes a current output of the filter, and updates the various data items stored in the filter data structure 109. Thus, the filter data structure 109 is similar in nature to the tape data structure 107, but instead of storing a large number of RTDI values and times, it condenses the data down to a smaller amount which is sufficient for a specific computational purpose.

As with the tape data structure 107, the spreadsheet application 105 preferably reserves memory for a useful number of filter data structures 109, such as 256 of these, each one referenced by direct user referencing with a unique filter number. These individual filter data structures 109 enable the user to define multiple different types of filters within a spreadsheet.

The interface of the filter function 113 is generally the same as the tape function 111, and has the form:

filter_name(filter_num, RT_ITEM, <other possible optional parameters>)

where filter-name specifies the name a particular filter function 113, filter_num specifies a filter number identifying a unique filter data structure 109 within the memory partition of the spreadsheet application 105 for storing the data for the filter function 113, and RT_ITEM specifies the real time data source 115 providing the RTDIs for the function.

In the preferred embodiment, there are a variety of different filter functions 113, each having a unique identifying name. A set of filter functions 113 usefully adapted to financial analysis, including their parameters and usage is listed in the List of Supported Functions, below.

Exemplary include filter functions 113 are listed in Table 1:

TABLE 1

Example Filter Functions

| | |
|---|---|
| adaptive Kalman | Returns prediction-error-minimizing forecase of next RTDI. |
| ARCH/GARCH | Returns the (generalized) autoregressive conditional heteroscedaskicity forecast of the next RTDI. |
| average | Returns the arithmetic mean of a sequence of a RTDIs |
| average_t | Returns the time-weighted arithmetic mean of a sequence of RTDIs. |
| count | Counts the number of values in a sequence of RTDIs. |
| difference | Returns the difference between a current RTDI and a prior RTDI. |
| maximum | Returns the maximum RTDI in a sequence of RTDIs. |
| minimum | Returns the minimum RTDI in a sequence of RTDIs. |
| drift | Returns the drift of the values in a sequence of RTDIs. |
| std. deviation | Returns the standard deviation of a sequence of RTDIs. |
| volatility | Returns the volatility of a sequence of RTDIs. |
| sign | Returns the sign of the difference between a current RTDI and a previous RTDI. |
| smooth | Returns the exponentially weighted moving average of a sequence of RTDIs. |
| sample std. deviation. | Returns the sample standard deviation of a sequence of RTDIs. |
| sample std. deviation_t | Returns the time weighted sample standard deviation of a sequence of RTDIs. |
| sum | Return the sum of a sequence of RTDIs |
| trim | Returns the trimmed value of an RTDI using absolute, percentage, or other limits. |

This list is not exhaustive, and many other types of filter functions 113 will be apparent to those of skill in the art.

In this context, and more generally, the tape function 111 and tape data structure 107 may be understood as a special case of the more general concept of a filter function 113 and filter data structure 109, whereby the tape function 111 tape() returns an array of RTDI values and corresponding update times.

For each of these and other operations on series of real time data there is a determinate "filter" equivalent formula which computes the current value of the function using the current value of an RTDI, a previously computed filter output value, and for a time dependent function, a latency between the currently received RTDI, and a previously received RTDI. For example, the time series formula for a time-weighted average function, is:

$$A_N \equiv \frac{1}{T_N - T_0} \sum_{i=1}^{N} S_{i-1}(T_i - T_{i-1}) \qquad \text{Eq. 3}$$

where $S_0, S_1, \ldots S_N$ are the RTDIs received from a real time data source 115 at respective time values $T_0, T_1, \ldots T_N$.

This equation can be reduced to its filter equivalent form:

$$A_M = \frac{T_{N-1} - T_0}{T_N - T_0} A_{N-1} + \frac{T_N - T_{N-1}}{T_N - T_0} S_{N-1} \qquad \text{Eq. 4}$$

which is used by the filter function 113 average_t(). Here it is clear that only five items of data need to be stored in the filter data structure 109 for this filter function 113: 1) the previously computed filter output $A_{N-1}$; 2) the time $T_{N-1}$ of the last received RTDI in $S_{N-1}$; 3) the last received RTDI in $S_{N-1}$; 4) the time $T_0$ of the first RTDI in $S_0$; and 5) the current RTDI in $S_N$ which will be used on the next iteration. This stored data is then used in conjunction with the time $T_N$ of this RTDI to compute the current filter output. As each new RTDI is received, the new filter function 113 computes the new output value, and stores it and the appropriate data items into the filter data structure 109.

A C-style pseudo code declaration for filter data structure 109 for an implementation of this filter function 113 for time weighted average may then be:

```
typedef    struct {
time_t   old_time;        /*last received time T(N-1)*/
time_t   start_time;      /*start time T(0)*/
double old_rtdi;          /*last rec'd RTDI in S(N-1)*/
double new_rtdi;          /*current RTDI in S(N)*/
double A;                 /*last computed output*/
} FILTER_AVER_T;
```

Once the new output of the filter function 113 is computed, it is stored to the output variable A, and the time of current RTDI is stored to old_time.

In the preferred embodiment, the spreadsheet application 105 supports a large number of the different filter functions 113, such as those listed above. Each filter function 113 will have its own particular filter equivalent form and data required for computation, as exemplarily described in the List of Supported Functions. Generally the data required by a filter function 113 is the currently received RTDI and the last output of the filter function 113. Auxiliary data varies according to the filter function 113 and may include: an initial RTDI value, and initial time value, a value type, a minimum delay or latency value, a decay factor, a difference limit, an upper or lower limit value, and a limit type (absolute or percentage). Other auxiliary data will be apparent to those of skill in the art as called for by the filter equivalent formulations underlying the filter functions 113.

Preferably then given the various types of data used in the plurality of filter functions 113, the actual filter data structure 109 is defined as the UNION of all such filter data types. Most individual of the data types for individual filter functions 113 may be implemented with less than a dozen variables.

Continuing the above example, the time weighted average filter function 113 would have the following interface:

AVERAGE_T(filter_num, RT_ITEM,initial_value, initial_time)

Here, the underlying filter data structure 109 is uniquely referenced by filter_num, which contains the data types defined in the above data structure definition. Each time the spreadsheet application 105 receives an RTDI, there is triggered the recomputation of the filter output and subsequent updating specific filter data.

Figure 4:
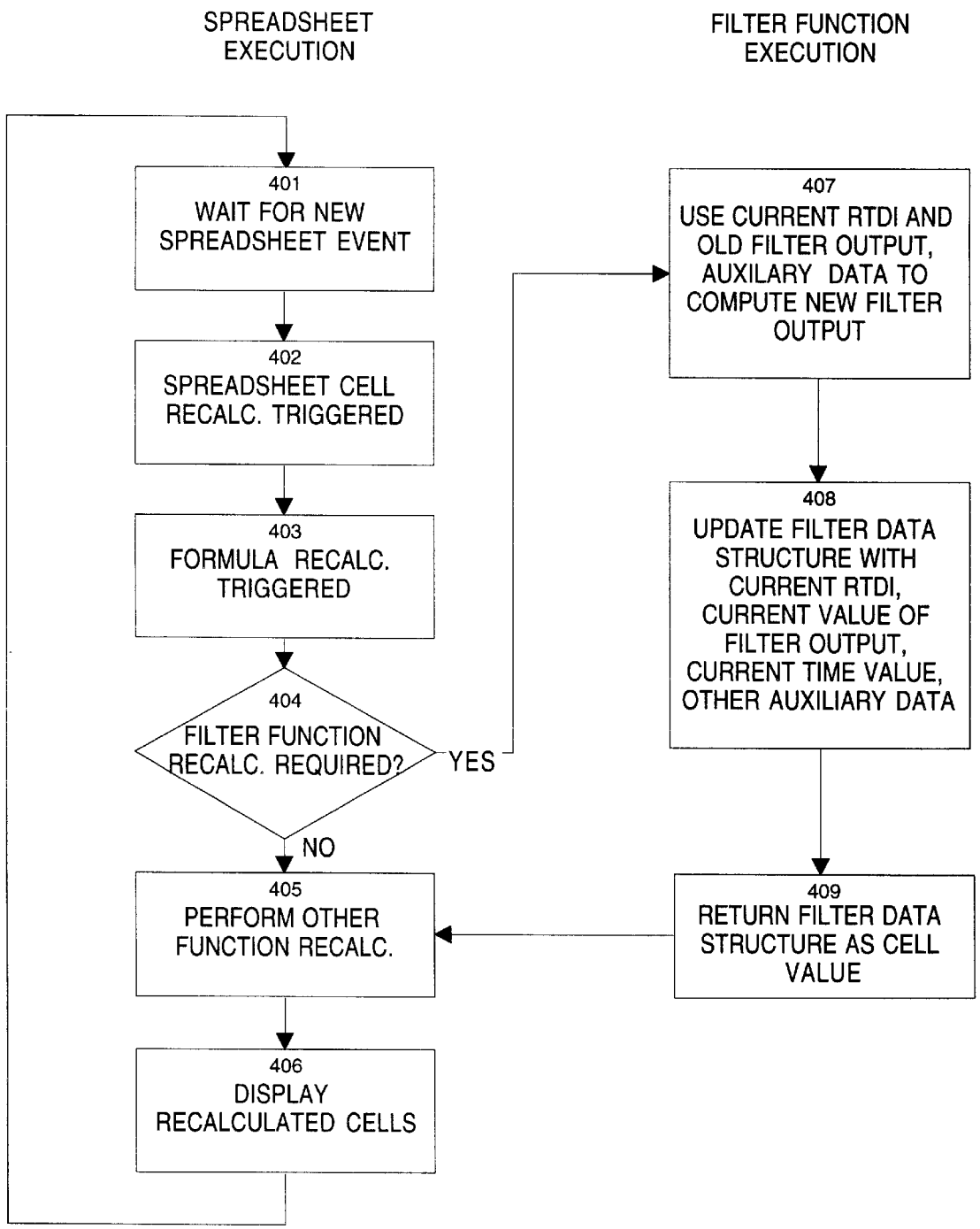
FIG. 4 is a flowgraph of the operation of the filter function.

Referring now to FIG. 4 there is shown a flowchart of the general operation of a filter function 113 within the spreadsheet application 105. For the purposes of explaining FIG. 4, it is assumed that the user has created a spreadsheet in which a filter function 113 is used in a cell definition, such as a cell defining an average filter, to average a sequence of RTDIs. As described above with respect to the tape function 111, the spreadsheet application 105 waits 401 for a spreadsheet event, which in turn triggers 402 recalculation of a spreadsheet cell. Most spreadsheets will construct a tree of cell dependencies by which the spreadsheet application 105 determines whether cell recalculation 402 is required, as not all cells include formulas dependent on the cells that have changed. Where such a formula is to be recalculated 403, the spreadsheet application 105 determines 404 whether a filter function 113 is included in the formula to be recalculated. If not, then the spreadsheet application 105 performs any other function recalculation 405 that is necessary, and displays 406 the results of the recalculated cells, including updating any graphs or plots based on recalculated cells.

In the situation of interest, the spreadsheet event that triggered 402 recalculation is the receipt of a new RTDI from the real time data source 115. This RTDI may be disposed into a variety of uses, including here, storage in a filter data structure 109 via a filter function 113. Accordingly, when a cell is checked at 404, then if there is a filter function 113 that references the real time data source 115, this filter function 113 will need to be recalculated.

The filter function 113 is called and executed. The filter function 113 determines which of the filter data structures 109 to operate on through the filter number parameter specified in its interface. The filter function 113 computes 407 a new filter output based on the currently received RTDI, the previous filter output, and any other auxiliary data specific to the filter function 113, such as the time value for the current or previous RTDI, the time of the first RTDI, and so forth. The particular algorithmic implementation of a given filter function 113 can be determined by those of skill in the art from its filter equivalent formulation, as exemplified above with respect to time weighted average function, and thus is not detailed here. The filter function 113 updates 408 the filter data structure 109 with the current value of the RTDI, the current filter output, and any necessary auxiliary data. The filter function 113 returns 409 the current value of the filter output to the spreadsheet cell, and the spreadsheet application 105 performs 405 any other function recalculation and displays 406 the updated cells. Again, the spreadsheet application 105 may update a graph or other computation based on the filter output, and display this result, thereby providing a continually updated graph or computation based on the filtered output of the real time data source 115.

In summary then, the tape and filter data structure and functions provide for the transformation of real time data items from a sequence of real time data items individually received over time within the spreadsheet itself, to globally available time series data, particularly through the storage of real time data items as time series data in the tape data structure via the tape function, and as summary, incremental data through the filter data structure and filter functions.

List of Supported Functions
Description of FEA Real-Time Filterpak

FEA Real-Time Filterpak is a set of spreadsheet add-in functions, templates, and utilities that display real-time time data in "ticker tape" fashion and calculate real-time statistics. With FEA Real-Time Filterpak you can use real-time spreadsheet data links to monitor and control financial applications.

As an example, suppose you have real-time data items representing the prices of various securities arriving into spreadsheet cells. You may be interested in calculating some standardized transformations of the data, for example, the volatility or drift of a sequence of prices. Alternatively, you may wish to know something as simple as which direction prices have moved since the prior price, or something as complex as your own proprietary definition of "price pressure," a calculated combination of price movements, trade volume, and time delays (or latencies).

All FEA Real-Time Filterpak results are displayed in a spreadsheet as either single-cell entries or as arrays. These results can be used like any other spreadsheet data.

FEA Real-Time Filterpak includes templates, a dynamic link library (XLL), utilities, and on-line documentation.

Functions are provided that accept a real-time input and display a "ticker tape" array of the input with corresponding update times. Other functions calculate real-time statistics such as volatility, drift, standard deviation, moving average, difference, minimum, and maximum.

To learn more about using FEA Real-Time Filterpak, see the Tutorial.

Filters

A filter is a calculation whose input is a time sequence of real-time data, and whose output is another such sequence. Since filters are intended to operate in real time, their current output value is the result of calculations which are applied to the current input value and possibly to prior input values. In other words, filters may be aware of what input data they have seen in the past (even though such past data may not be displayed anywhere in the spreadsheet). They are also aware of the latency, or elapsed time period, since they saw this past data. By using the past input data and latencies they have encountered, filters may modify the way in which they transform current input.

Implementation of Filters in FEA Real-Time Filterpak

The FEA Real-Time Filterpak filters are implemented as spreadsheet add-in functions. The function arguments are generally a filter number, a reference to a real-time data item, and possibly other parameters. For example, the RTPRICEVOL function calculates the price volatility of a stream of a single real-time data item coming to it as one of the function arguments. The other function arguments represent parameters which may direct the function regarding alternative methods of proceeding with the calculation. The real-time data item maybe a reference to any cell in the spreadsheet. Consequently, filters maybe cascaded, so that the filter output to a cell in the spreadsheet becomes the real-time data item for another filter.

Filter Numbers

Normally, all the data in a spreadsheet appears within the spreadsheet cells. By contrast, filters store their data "behind the spreadsheet" in special global data structures. These data structures are organized and referenced directly by you via the filter numbers.

Filter-related global data is kept organized by you through providing appropriate filter numbers. That is, the global data belonging to a filter is associated only with that filter number. Therefore, except in special circumstances, multiple filter functions within a single spreadsheet should generally not reference the same filter number, as the results may become unpredictable. This is because each function invocation will attempt to save its own global data into the filter, giving rise to usage conflicts.

Organizing Filter Numbers

The first argument of all the FEA Real-Time Filterpak functions except RTTAPE is filter_num. This argument is a number specifying the filter number and is an (arbitrary) integer between 0 and 255, inclusive. It uniquely identifies a global memory location where the function stores global data and should be different for each FEA Real-Time Filterpak function usage, even if the functions are contained in the same cell, refer to the same rt_data_item, or are on different open spreadsheet files. This means you can have a maximum of 256 filter usages present in all open spreadsheet files, including spreadsheet files in different spreadsheet application sessions.

Organize your spreadsheet so that each filter function call references only a single filter number. It is suggested that you employ filters in numerical order, i.e., 0 first, 1 next, and so on.

To clear the global data associated with all the filter numbers, exit all sessions of Microsoft Excel.

Tip: Good programming practice usually means that all filter numbers be constants. (If the filter number is changed, new global data is referenced, so previous results are no longer updated.) Sophisticated users who deal with multiple open spreadsheet files may find that the best form of filter number reference is base+constant, where base is a single-cell reference, so that the cell contents may be changed to quickly remove multiple-sheet filter number conflicts.

Tapes

Tapes are special forms of filters, namely filters which do not perform any special data reduction, but merely retain a large number of past values and latencies in their original form. In order that these past values and latencies can be made available for spreadsheet calculations, tapes also differ by returning an array range of values instead of single cells. Standard tapes internally contain 256 pairs of real-time data values, or ticks, and corresponding updates times (so latencies are actually the differences of successive update times). Where tape values are displayed in spreadsheet ranges, you may display any number of the 256 pairs in the cells of the chosen range. As new real-time data values arrive, the tape range will appear to scroll, giving the appearance of a common "ticker tape" such as seen in your stockbroker's office, hence the name "tape." Tapes are used by RTTAPE.

Tapes are useful for real-time dynamic charts and performing custom (i.e., user-defined) filter transformation. For example, you could easily implement a thirty-tick "moving average" calculation.

Dynamic Data Exchange (DDE)

Dynamic data exchange (DDE) is a mechanism supported by the Microsoft Windows operating system that allows two applications to "talk" to each other by continuously and automatically exchanging data. DDE is supported by most Windows real-time data and productivity applications.

DDE Conversations

Two applications exchange information by engaging in a DDE conversation. The application that initiates the conversation is called the destination application, or just the destination; the application responding to the destination is the source application, or just the source. An application can engage in several conversations at the same time, acting as the destination in some and source in others. There is nothing special about an application that makes it a destination or source; these are simply roles an application can adopt.

When a destination application begins a DDE application, it must specify the following:

The name of the source application with which it will talk.
The subject of the conversation, called the topic.

When a source application receives a request for a conversation it recognizes, it responds, and a conversation is started. Once established, a conversation cannot change applications or topics. The combination of application and topic uniquely identifies the conversation, and it remains constant for the duration of the conversation. If either the destination or source changes the application or topic, the conversation is ended.

During the conversation, the destination and source may exchange information concerning one or more items. Items are references to the data that are meaningful to both applications. Either the destination or the source can change the item without affecting the state of the conversation.

Application Name

Every application that can be a DDE source has a unique application name. Usually this is the executable filename without an extension. When performing DDE, the application name is not case-sensitive.

Topic

The topic defines the subject of the DDE conversation and is usually some unit of data that is meaningful to the source application. As with the application name, the topic for a DDE conversation is not case-sensitive.

Many applications that perform DDE support a topic called "System." You can use this topic to request information from the application (for example, the other topics it supports). Check the documentation for the application to see if it supports this topic.

Item

The item identifies the piece of data actually being passed during the DDE conversation. As with the application name and topic, the item for a DDE conversation is not case-sensitive.

Further Reading

For technical information on DDE see the Programmer's Guides for Microsoft Visual Basic, Microsoft Visual C++, or any of the Microsoft operating systems.

DDE Links in Microsoft Excel

In the context of FEA Real-Time Filterpak, the DDE source application is a real-time data application, such as those on the Reuter Terminal or Telerate Workstation, and the destination application is Microsoft Excel.

Types of DDE Links

A DDE conversation is often called a link because the two applications in the conversation are linked by the data they are exchanging. This link between applications is a "channel" through which data flows. In Microsoft Excel there are two kinds of links, distinguished by how the source updates the destination when data in the source changes:

Automatic link—The real-time data source supplies data to Microsoft Excel every time the data changes.
Manual link—The real-time data source supplies data only when Microsoft Excel requests it.

Generally, all Microsoft Excel DDE links to real-time data source applications should be automatic links.

Remote Reference Formulas

You create DDE links between the real-time source application and Microsoft Excel by entering a remote reference formula into an Excel worksheet cell. A remote reference formula takes the form:

=APPLICATION_NAME I TOPIC_NAME ! ITEM

APPLICATION_NAME is the application name. TOPIC_NAME is the topic. ITEM is the item. If ITEM contains blanks, commas, or other delimiters, then surround the entire item with single quotes.

The source application name is separated from the topic by a vertical bar or "pipe" character "I" (character code 124). The topic is separated from the item by an exclamation point character "!". Do not insert spaces adjacent to the separator characters.

See the source application's documentation for these values. Here are sample values for some source applications:

Reuter Terminal
  Application: REUTER
  Topic: IDN
  Example Excel Formula: =REUTERIIDN!'DEM=,BID'
Telerate Workstation
  Application: TWINDDE
  Topic: ITEMS or QUOTES (depending on the type of instrument requested)
  Example Excel Formula: =TWINDDEIITEMS!'DEM LAST'

FEA TICKER
   Application: TICKER
   Topic: TICK
   Example Excel Formula: =TICKER|TICK!PRICE Most real-time applications come with utilities that make it easy to create DDE links in Microsoft Excel. Contact your real-time data vendor for maximum number of DDE links permitted in a spreadsheet.

Controlling Calculation in Microsoft Excel

Calculation is the process of computing formulas and then displaying the results as values in the cells that contain the formulas.

FEA Real-Time Filterpak functions are intended to be used in Automatic calculation mode. To set calculation to Automatic, choose Options (Tools menu), click the Calculation tab, under Calculation select Automatic.

Microsoft Excel only calculates in "Ready" mode. The left side of the status bar displays the current mode. (The status bar is located at the bottom of the Microsoft Excel window; if it is not displayed, choose Options (Tools menu), click the View Tab, under Show select Status Bar.)

Microsoft Excel will not calculate while 1) in "Enter" mode, that is, you have started typing in a cell, 2) in "Edit" mode, that is, you have pressed F2 or clicked in the formula bar, or 3) a modal dialog box is displayed, that is, you have chosen a menu command followed by an ellipsis ". . .". Since Microsoft Excel cannot receive real-time data during these situations, you will lose real-time data updates that occur during these situations.

Controlling DDE Link Behavior in Microsoft Excel

Typically there are multiple DDE links between the source and Microsoft Excel. You can control each link in your workbook individually. Choose Links (Edit menu) to display the Links dialog box, which lists every link that exists on the currently active sheet in the workbook. All links from real-time source applications should be set to automatic updating (the default). Microsoft Excel updates automatic links when you open the workbook and when the source application changes while the workbook is open. (Manual links update only when you choose Links (Edit menu) and click Update Now.)

To make Microsoft Excel update links automatically, choose Options (Tools menu), click the Calculation Tab, and then select the Update Remote References check box. If this check box is cleared, Microsoft Excel will not update your real-time references, it will only display the last values received by the source application. This option affects only the active workbook. Clearing this check box overrides automatic updating set for individual links in the Links dialog box.

To see a message each time before linked items are updated automatically, choose Options (Tools menu), click the Edit tab, and then select the Ask To Update Automatic Links check box. When the spreadsheet you're opening contains automatic links Microsoft Excel displays the message "This document contains links. Re-establish links?" Click Yes to update the linked data with the most current data. (Clicking No keeps the current linked data.)

If you open a spreadsheet containing linked items and the source application is not running then Microsoft Excel displays the message "Remote data not accessible. Start application [app_name]?" where [app_name] is the name of the source application. Click Yes to start the source application. If Microsoft Excel cannot find [app_name] it will display an error message and you will have to start it manually.

To save copies of values contained in linked cells in the spreadsheet, choose Options (Tools menu), click the Calculation tab, and then select the Save External Link Values check box. Depending on the number of links, this may increase the disk space and time needed to open the spreadsheet.

Further Reading

For detailed information about using DDE in Microsoft Excel, see the following books:

Microsoft ExcelNisual Basic for Windows 95 Programmer's Guide (Microsoft Press, 1995), ISBN 1-55615-819-X Developing Microsoft Excel Solutions, 2nd ed., by Eric Wells (Microsoft Press, 1995), ISBN 1-55615-893-9

Troublesome Data

The values of real-time data items must be numeric for all FEA Real-Time Filterpak functions except RTCOUNT. Some functions, such as RTPRICEVOL, have the further restriction that all the values must be greater than zero. Occasionally, a non-numeric value (e.g., 123A5) or invalid value (e.g., a negative price) may be sent by your real-time data source application. FEA Real-Time Filterpak functions ignore illegal values—the functions do not update the global memory location containing latency and other data. In other words, FEA Real-Time Filterpak functions treat unacceptable real-time data values as if they had never occurred.

Another type of error is an order-of-magnitude error. Your real-time data source application may send a value that is vastly different from the previous value (with respect to its volatility). For example, a low-volatility stock ticks up from 1 to 11.25. While infrequent, such movements are possible and are interpreted by FEA Real-Time Filterpak functions as valid real-time data values and calculations proceed normally. However, some functions, such as RTPRICEVOL, have parameters which can be used to "clip" the amount of output change which will be permitted. These order-of-magnitude errors can usually be attributed to a keypunch error by the real-time data contributor. For example, in the example above, the real price of the stock was probably meant to be 1.125, not 11.25.

There are several ways you can detect these errors. For example, you can use RTCOUNT to count the number of non-numeric real-time data values or values greater than or equal to zero. You can search for statistical outliers by charting the values returned by RTTAPE, or use RTMIN and RTMAX to find the smallest and largest values, respectively, of a real-time data stream. Or, you can use RTTRIM to exclude outlying data from your analysis.

Tutorial

This section gives a brief tutorial on FEA Real-Time Filterpak.

After installation, to start using FEA Real-Time Filterpak, perform the following steps:

1. Start the TICKER program.
   2. Open the FEA Real-Time Filterpak template rtfilt.xls.
   3. Load the FEA Real-Time Filterpak add-in rtfilt[32].xll.
   4. Observe the real-time calculations.

1. Start the TICKER program

TICKER is a Microsoft Windows program that generates a series of simulated real-time prices based on user-specified parameters. The prices are log normally distributed and the arrival times of those prices are exponentially distributed.

Start TICKER by double-clicking the TICKER icon in the FEA Real-Time Filterpak program group that was created when you installed FEA Real-Time Filterpak. The Input Parameters determine how prices are generated, you can experiment with them later but don't change them now. Click Start—the PRICE item changes from red to green to indicate that prices are being generated.

2. Open the FEA Real-Time Filterpak template rtfilt.xls

FEA Real-Time Filterpak includes a sample spreadsheet names rtfilt.xls. It contains all the FEA Real-Time Filterpak function calls and provides a logical layout.

To open the sample template, double-click the FEA Real-Time Filterpak icon in the FEA Real-Time Filterpak program group. Alternatively, start Microsoft Excel and choose Open (File menu). The sample spreadsheet is located in the directory in which you installed FEA Real-Time Filterpak.

When you open the sample template, Microsoft Excel may prompt you "This document contains links. Re-establish links?" Click Yes and the cells containing real-time DDE links to TICKER will start updating with the most current data.

3. Load the FEA Real-Time Filterpak add-in rtfilt[32].xll

Add-ins are files that can be installed to add commands and functions to your spreadsheet. The FEA Real-Time Filterpak add-in is in the directory you where installed FEA Real-Time Filterpak. If you are using Microsoft Excel 5.0 (16-bit), the add-in is rtfilt.xll. If you are using Microsoft Excel 7.0 or higher (32-bit), the add-in is rtfilt32.xll. You can find out which version of Microsoft Excel you are using by choosing About (Help menu).

To load the FEA Real-Time Filterpak add-in into Microsoft Excel, choose Add-ins (Tools menu), then in the Add-ins Available box, select the check box next to the FEA Real-Time Filterpak add-in. If the FEA Real-Time Filterpak add-in is not listed, click Browse to locate it.

4. Observe the real-time calculations

If everything is operating correctly, you should see data and charts changing as TICKER sends real-time data into the spreadsheet cells.

About Spreadsheet Functions

Spreadsheet functions perform value-returning operations in spreadsheets automatically and return their results in a single cell or a rectangular array of cells. The functions included with FEA Real-Time Filterpak require you to install the add-in before you can use the add-in functions; see your spreadsheet's User's Guide or on-line help for information on installing or removing an add-in.

Conventions

In the syntax line, required arguments are bold and optional arguments are in plain text (not bold).

Argument names usually use underline characters between words; for example filter_num is an argument name.

Functions are shown without the equal sign (=). Remember to type an equal sign at the beginning of every formula, but not before functions in nested formulas.

Syntax of Functions

When you type a function and enter it into a cell, you must use proper function syntax, that is, the sequence of characters used to enter a valid function. Every function description includes a syntax line, for example:

FUNCTIONNAME(arg1, arg2, arg3)

In the syntax line, the required arguments are bold; optional arguments are not bold. If you do not provide required arguments to a function, you will not be able to enter the function in a cell. In the preceding example, the arguments arg1 and arg2 are bold and therefore required. Arg3 is not bold and therefore is optional, so either of the following is allowed (assume arg1 is a string argument and arg2 and arg3 are numeric arguments):

FUNCTIONNAME("some text", 10, 3.14159)

FUNCTIONNAME("some text", 10)

However, FUNCTIONNAME("some text"), FUNCTIONNAME(,10), and FUNCTIONNAME() are not allowed because both arg1 and arg2 are required arguments.

Arguments

Arguments to a function can be any of the following:

Numbers Examples of numbers are 0, 622.1962, 0.005, and −40.002. Numbers without trailing decimals are called integers. Examples of integers are 0, 622, and −40.

Text Examples of text are "a", "Chris", "123", or "". Text, or string, values used in formulas must be enclosed in double quotation marks. A text constant that contains no characters is written as "" and is called empty text or a zero-length string.

Logical values The logical values are TRUE and FALSE. Logical arguments can also be statements that evaluate to TRUE or FALSE.

References Examples of references are $A$1, A1, $A1, A$1, or $A$1:$F$33 References can refer to single cells or ranges. When you use a reference as an argument that is supposed to be a number, text, or logical value, the contents of the cells specified by the reference are used as the argument.

Arrays Arrays can be used as arguments (e.g., {1,2,3}), and formulas can be entered as array formulas. See Array Formulas below for more information.

Using the Function Wizard

In Microsoft Excel, the Function Wizard is an interactive set of dialog boxes that guide you through the steps of choosing the function and arguments to use in your formula.

To start the Function Wizard, choose Function (Insert menu). The first Function Wizard dialog box contains a list of function categories, such as Financial and Logical, and a list of functions, such as COUNT and SUM. The functions are in the category FEA Functions. (This dialog is skipped in the active cell already contains a function.) In the second dialog box, you describe the function argument values.

Array Formulas

Some functions are entered as array formula. Array formulas produce more than one result and so their output occupies several spreadsheet cells. Therefore, array formulas return an array range, which is a rectangular range of cells that share a common formula.

Because an array range shares one formula, you must edit an array range differently from ordinary cells. When you edit an array range, you edit the entire range at once as if it were a single cell. You cannot perform any operation that modifies only a portion of the array range, such as:

Change the contents of cells that are a part of an array.

Clear, move, or delete cells that are part of an array.

Insert cells into an array range.

If you attempt any of these operations, your spreadsheet displays a message that tells you the operation cannot be done for an array. You can, however, format individual cells in an array range and copy and paste all or part of an array range to another part of the spreadsheet.

Editing Array Formulas in Microsoft Excel

This following instructions describe how to enter, edit, clear, and select array formulas and ranges in Microsoft Excel.

To enter an array formula

1. Select the cell or range of cells in which you want to enter the formula.

2. Enter the formula.

Microsoft Excel adds braces when you enter the formula as an array; do not type braces around the formula. If you do, Microsoft Excel interprets the entry as text.

3. Press CTRL+SHIFT+ENTER.

You must hold down both the CTRL and SHIFT keys when you press ENTER. If you hold down only the SHIFT key, the formula is entered as an ordinary formula in the active cell. If you hold down only the CTRL key, the formula is entered as an ordinary formula in all the selected cells.

To edit an array formula
1. Select any cell in the array range.
2. Activate the formula bar.

The array formula braces disappear when the formula bar is active.
3. Edit the formula.
4. Press CTRL+SHIFT+ENTER.

To clear an array range
1. Select the array range.
2. Press DEL (or choose Clear (Edit menu), and then choose Contents).

To select an array range
1. Select any cell in the array range.
2. Press CTRL+/.

| FEA Real-Time Filterpak Functions | |
|---|---|
| RTAVERAGE | Returns the arithmetic mean of a real-time variable. |
| RTAVERAGET | Returns the time-weighted arithmetic mean of a real-time variable. |
| RTCOUNT | Counts the number of values of a real-time variable. |
| RTDIFF | Returns the difference between the current value of a real-time variable and its prior value. |
| RTMAX | Returns the maximum of a real-time variable. |
| RTMIN | Returns the minimum of a real-time variable. |
| RTPRICEDRIFT | Returns the price drift of a real-time variable. |
| RTPRICESTDEV | Returns the price standard deviation of a real-time variable. |
| RTPRICEVOL | Returns the price volatility of a real-time variable. |
| RTSIGN | Returns the sign (−1, 0, 1) of the difference between the current value of a real-time variable and its prior value. |
| RTSMOOTH | Returns the exponentially-weighted moving average of a real-time variable. |
| RTSTDEV | Returns the sample standard deviation of a real-time variable. |
| RTSTDEVT | Returns the time-weighted standard deviation of a real-time variable. |
| RTSUM | Returns the sum of the values of a real-time variable. |
| RTTAPE | Returns an array of real-time variable values and corresponding update times. |
| RTTRIM | Returns the trimmed values of a real-time variable. |
| RTVERSION | Returns the version of the current FEA Real-Time Filterpak add-in, as text. |

RTAVERAGE

Returns the arithmetic mean of a real-time variable.

Syntax

RTAVERAGE(filter_num, rt_data_item)

filter_num is a number specifying the filter number and is an integer between 0 and 255, inclusive. The filter number uniquely identifies a global memory location where the function stores cumulative results and must be different for each FEA Real-Time Filterpak function usage, even if the functions are contained in the same cell, refer to the same rt_data_item, or are in different open spreadsheet files. filter_num should be a constant. If the filter number is changed, new global data is referenced.

rt_data_item is a reference to a cell containing a numeric real-time data item.

Remarks

Latency is not used in calculations.

filter_num is truncated to an integer.

The equation for the arithmetic mean is:

$$\overline{X} = \frac{\sum_{i=1}^{n} x_i}{n}$$

EXAMPLES

If cell A1 contains a real-time data item with the values:

| Value | Arrival time (sec.) |
|---|---|
| 10 | 0 |
| 9 | 1 |
| 11 | 4 |
| 12 | 8 |
| 11 | 9 |
| RTAVERAGE(0, A1) equals 10.6 | |

RTAVERAGET

Returns the time-weighted arithmetic mean of a real-time variable.

Syntax

RTAVERAGET(filter_num, rt_data_item, initial_value, initial_time)

filter_num is a number specifying the filter number and is an integer between 0 and 255, inclusive. The filter number uniquely identifies a global memory location where the function stores cumulative results and must be different for each FEA Real-Time Filterpak function usage, even if the functions are contained in the same cell, refer to the same rt_data_item, or are in different open spreadsheet files. filter_num should be a constant. If the filter number is changed, new global data is referenced.

rt_data_item is a reference to a cell containing a numeric real-time data item.

initial_value is a number specifying the prior value of the time-weighted average, i.e., before the first invocation of the function. If initial_value is omitted then no prior value is used.

initial_time is a number specifying the time period in seconds over which initial_value was evaluated. This becomes the weight in the subsequent time-weighted average. If initial_time is omitted or 0 (zero) then no initial value is used.

Remarks

Latency is used in calculations.

filter_num is truncated to an integer.

Specify initial_value and initial_time to include a previously observed average or influential observation in the results.

RTAVERAGET creates a time-weighted average of the rt_data_item values. This average spans the time period from the first rt_data_item update to the most current update.

The equation for the time-weighted arithmetic mean is:

$$\overline{X}_{tw} = \frac{\sum_{i=1}^{n} x_i \Delta t_i}{\sum_{i=1}^{n} \Delta t_i}$$

where x(i) is the value of rt_data_item at time t(i), and Δt(i) is the time elapsed between updates i and i −1.

EXAMPLES

If cell A1 contains a real-time data item with the values:

| Value | Arrival time (sec.) |
|---|---|
| 10 | 0 |
| 9 | 1 |
| 11 | 4 |
| 12 | 8 |
| 11 | 9 |
| RTAVERAGET(0, A1) equals 10.33 | |

RTCOUNT

Counts the number of values of a real-time variable.

Syntax

RTCOUNT(filter_num, rt_data_item, value_type)

filter_num is a number specifying the filter number and is an integer between 0 and 255, inclusive. The filter number uniquely identifies a global memory location where the function stores cumulative results and must be different for each FEA Real-Time Filterpak function usage, even if the functions are contained in the same cell, refer to the same rt_data_item, or are in different open spreadsheet files. filter_num should be a constant. If the filter number is changed, new global data is referenced.

rt_data_item is a reference to a cell containing a text or numeric real-time data item.

value_type is a number specifying the type of values to count.

| value_type | Count these values |
|---|---|
| 0 or omitted | All values (text and numeric). |
| 1 | All numeric values. |
| 2 | All numeric values >= 0. |
| 3 | All numeric values > 0. |
| 4 | Text values, i.e., values that could not be converted into numbers. |

Remarks

Latency is not used in calculations.

filter_num and value_type are truncated to integers.

Set value_type to 4 to determine if your real-time feed has updated with non-numeric values. All non-numeric values are ignored by FEA Real-Time Filterpak functions that require numeric input.

To count the number of Microsoft Excel error values (#N/A, #VALUE!, #DIV/0!, etc.) returned by a real-time variable use the ISERROR worksheet function to convert the error value into a text value (say, "error"), then use RTCOUNT with value_type equal to 4.

EXAMPLES

If cell A1 contains a real-time data item with the values:

| Value | Arrival time (sec.) |
|---|---|
| 1 | 0 |
| 2 | 1 |
| 0 | 3 |
| A | 4 |
| −1 | 6 |
| 0 | 8 |
| 1 | 12 |
| RTCOUNT(0, A1, 0) equals 7 | |
| RTCOUNT(1, A1, 1) equals 6 | |
| RTCOUNT(2, A1, 2) equals 5 | |
| RTCOUNT(3, A1, 3) equals 3 | |
| RTCOUNT(4, A1, 4) equals 1 | |

RTDIFF

Returns the difference between the current value of a real-time variable and its prior value.

Syntax

RTDIFF(filter_num, rt_data_item, delay)

filter_num is a number specifying the filter number and is an integer between 0 and 255, inclusive. The filter number uniquely identifies a global memory location where the function stores cumulative results and must be different for each FEA Real-Time Filterpak function usage, even if the functions are contained in the same cell, refer to the same rt_data_item, or are in different open spreadsheet files. filter_num should be a constant. If the filter number is changed, new global data is referenced.

rt_data_item is a reference to a cell containing a numeric real-time data item.

delay is the minimum required latency in seconds since the prior arrival of rt_data_item. If delay is zero or less, then no minimum latency is required. If delay is positive, then at least an integral number of seconds not less than delay must have passed for the new difference to be returned, otherwise the prior value will be returned. If delay is omitted then zero is used.

Remarks

Latency is used in calculations if delay is positive.

filter_num is truncated to an integer.

delay is rounded up to the nearest integer.

A negative result means rt_data_item has declined since its previous value, a positive result means it has increased, and a zero result means there has been no change.

When rt_data_item is updated with a new value, RTDIFF returns the difference between that new value and its prior value. However, if fewer than delay seconds have passed since the last rt_data_item update, no action occurs; in fact any number of such new updates may occur within the minimum delay period and all will be ignored, so RTDIFF will not change. The first update which occurs after the minimum delay period has passed will be differenced with the value which was seen at least delay seconds ago, and this difference is returned by the function. If no minimum delay time is desired, delay should be set to zero. In this case, RTDIFF will return differences of all successive rt_data_item values.

You can nest RTDIFF to find second, third, and higher-order differences. Be sure to use a separate filter number for each. For example, RTDIFF(1, RTDIFF(0, A1)) returns the second-order differences of a real-time data item in cell A1.

EXAMPLES

If cell A1 contains a real-time data item with the values:

| Value | Arrival time (sec.) |
|---|---|
| 10 | 0 |
| 9 | 1 |
| 11 | 4 |
| 12 | 8 |
| 11 | 9 |
| RTDIFF(0, A1, 0) equals −1 (=11-12) | |

-continued

| Value | Arrival time (sec.) |
|---|---|
| RTDIFF(1, A1, 3) equals 0 (=11-11) | |
| RTDIFF(2, A1, 6) equals 2 (=11-9) | |

RTMAX
Returns the maximum value of a real-time variable.
Syntax
RTMAX(filter_num, rt_data_item)
filter_num is a number specifying the filter number and is an integer between 0 and 255, inclusive. The filter number uniquely identifies a global memory location where the function stores cumulative results and must be different for each FEA Real-Time Filterpak function usage, even if the functions are contained in the same cell, refer to the same rt_data_item, or are in different open spreadsheet files. filter_num should be a constant. If the filter number is changed, new global data is referenced.
rt_data_item is a reference to a cell containing a numeric real-time data item.
Remarks
Latency is not used in calculations.
filter_num is truncated to an integer.

EXAMPLES

If cell A1 contains a real-time data item with the values:

| Value | Arrival time (sec.) |
|---|---|
| 10 | 0 |
| 9 | 1 |
| 11 | 4 |
| 12 | 8 |
| 11 | 9 |
| RTMAX(0, A1) equals 12 | |

RTMIN
Returns the minimum value of a real-time variable.
Syntax
RTMIN(filter_num, rt_data_item)
filter_num is a number specifying the filter number and is an integer between 0 and 255, inclusive. The filter number uniquely identifies a global memory location where the function stores cumulative results and must be different for each FEA Real-Time Filterpak function usage, even if the functions are contained in the same cell, refer to the same rt_data_item, or are in different open spreadsheet files. filter_num should be a constant. If the filter number is changed, new global data is referenced.
rt_data_item is a reference to a cell containing a numeric real-time data item.
Remarks
Latency is not used in calculations.
filter_num is truncated to an integer.

EXAMPLES

If cell A1 contains a real-time data item with the values:

| Value | Arrival time (sec.) |
|---|---|
| 10 | 0 |
| 9 | 1 |
| 11 | 4 |
| 12 | 8 |
| 11 | 9 |
| RTMIN(0, A1) equals 9 | |

RTPRICEDRIFT
Returns the price drift of a real-time variable.
Syntax
RTPRICEDRIFT(filter_num, rt_data_item, initial_value, decay_factor, delay, limit)
filter_num is a number specifying the filter number and is an integer between 0 and 255, inclusive. The filter number uniquely identifies a global memory location where the function stores cumulative results and must be different for each FEA Real-Time Filterpak function usage, even if the functions are contained in the same cell, refer to the same rt_data_item, or are in different open spreadsheet files. filter_num should be a constant. If the filter number is changed, new global data is referenced.
rt_data_item is a reference to a cell containing a positive real-time data item.
initial_value is a number specifying the initial value of the price drift y(0). It is used before the first invocation of the function occurs.
decay_factor is a number specifying the decay factor and is a number between greater than or equal to zero and strictly less than one. Higher values give more weight to prior observations. The decay factor is commonly called lambda ($\lambda$).
delay is the minimum required latency in seconds since the prior arrival of rt_data_item. If delay is zero or less, then no minimum latency is required. If delay is positive, then at least an integral number of seconds not less than delay must have passed for the new difference to be returned, otherwise the prior value will be returned. If delay is omitted then zero is used.
limit is a number specifying the maximum absolute movement (up or down) that the new price drift can move from its previous value. If a new value of rt_data_item causes the new calculated price drift to move either below the prior value−limit or above the prior value+limit then the limiting value of the price drift (that is, either prior value−limit or prior value+limit) is returned, otherwise the new price drift is returned as calculated. If limit is omitted then no limits are used.
Remarks
Latency is used in calculations if delay is positive.
filter_num is truncated to an integer.
delay is rounded up to the nearest integer.
If decay_factor<0 or decay_factor>=1, RTPRICEDRIFT returns an error value.
The price drift y(n) is calculated iteratively by:

$$y_n = \lambda\, y_{n-1} + (1 - \lambda)\frac{\log(x_n) - \log(x_{n-1})}{t_n - t_{n-1}}$$

where $\lambda$ is decay_factor, initial_value is the initial value y(0), and log denotes the natural logarithm.
Higher values of decay_factor give more weight to prior observations. More precisely, set K=−1/log(decay_factor). K is the approximate number of price observations, or ticks, in the past beyond which the weights start to become negligible. For instance, decay_factor=0.90 gives K=9 (approximately), means that the weights given to the observations K, 2K, 3K, . . . , mK ticks in the past, are factors of $e = 2.7183\ldots, e^2, e^3, \ldots, e^m$, respectively, smaller than that assigned to the most recent observation. The information can be converted into time units by multiplying K by the average time interval between ticks if delay=0, or by delay if delay is greater than this interval.

The price drift can be interpreted as the annualized, instantaneous, average rate-of-return of a security.

EXAMPLES

If cell A1 contains a real-time data item with the values:

| Value | Arrival time (sec.) |
|---|---|
| 10 | 0 |
| 9.98 | 1 |
| 9.99 | 4 |
| 10.1 | 8 |
| 10.08 | 9 |
| RTPRICEDRIFT(0, A1, 0, 0.999, 0) equals −12.43 | |
| RTPRICEDRIFT(1, A1, 0, 0.999, 2) equals 33.98 | |

RTPRICESTDEV

Returns the price standard deviation of a real-time variable.

Syntax

RTPRICESTDEV(filter_num, rt_data_item)

filter_num is a number specifying the filter number and is an integer between 0 and 255, inclusive. The filter number uniquely identifies a global memory location where the function stores cumulative results and must be different for each FEA Real-Time Filterpak function usage, even if the functions are contained in the same cell, refer to the same rt_data_item, or are in different open spreadsheet files. filter_num should be a constant. If the filter number is changed, new global data is referenced.

rt_data_item is a reference to a cell containing a positive real-time data item.

Remarks

Latency is not used in calculations.

filter_num is truncated to an integer.

The equation for the price standard deviation is:

$$s_p = \sqrt{\frac{n\left(\sum_{i=1}^{n} z_i^2\right) - \left(\sum_{i=1}^{n} z_i\right)^2}{n(n-1)}}$$

$$z_i = \log\left(\frac{x_i}{x_{i-1}}\right)$$

where log denotes the natural logarithm.

The price standard deviation is commonly called historical volatility.

EXAMPLES

If cell A1 contains a real-time data item with the values:

| Value | Arrival time (sec.) |
|---|---|
| 10 | 0 |
| 9.98 | 1 |
| 9.99 | 4 |
| 10.1 | 8 |
| 10.08 | 9 |
| RTPRICESTDEV(0, A1) equals 0.0026 | |

RTPRICEVOL

Returns the volatility of a real-time variable.

Syntax

RTPRICEVOL(filter_num, rt_data_item, initial_value, decay_factor, delay, limit)

filter_num is a number specifying the filter number and is an integer between 0 and 255, inclusive. The filter number uniquely identifies a global memory location where the function stores cumulative results and must be different for each FEA Real-Time Filterpak function usage, even if the functions are contained in the same cell, refer to the same rt_data_item, or are in different open spreadsheet files. filter_num should be a constant. If the filter number is changed, new global data is referenced.

rt_data_item is a reference to a cell containing a positive real-time data item.

initial_value is a number specifying the initial value of the price volatility y(0). It is used before the first invocation of the function occurs.

decay_factor is a number specifying the decay factor and is a number between greater than or equal to zero and strictly less than one. Higher values give more weight to prior observations. The decay factor is commonly called lambda ($\lambda$).

delay is the minimum required latency in seconds since the prior arrival of rt_data_item. If delay is zero or less, then no minimum latency is required. If delay is positive, then at least an integral number of seconds not less than delay must have passed for the new difference to be returned, otherwise the prior value will be returned. If delay is omitted then zero is used.

limit is a number specifying the maximum absolute movement (up or down) that the new price volatility can move from its previous value. If a new value of rt_data_item causes the new calculated price volatility to move either below the prior value−limit or above the prior value+limit then the limiting value of the price volatility (that is, either prior value−limit or prior value+limit) is returned, otherwise the new price volatility is returned as calculated. If limit is omitted then no limits are used.

Remarks

Latency is used in calculations if delay is positive.

filter_num is truncated to an integer.

delay is rounded up to the nearest integer.

If decay_factor<0 or decay_factor>=1, RTPRICEVOL returns an error value.

The price volatility y(n) is calculated iteratively by:

$$y_n^2 = \lambda y_{n-1}^2 + (1-\lambda) z_n^2$$

$$z_n^2 = \frac{(\log(x_n) - \log(x_{n-1}))^2}{t_n - t_{n-1}}$$

where $\lambda$ is decay_factor, initial_value is the initial value y(0), and log denotes the natural logarithm.

Higher values of decay_factor give more weight to prior observations. More precisely, set K=−1/log(decay_factor). K is the approximate number of price observations, or ticks, in the past beyond which the weights start to become negligible. For instance, decay_factor=0.90 gives K=9 (approximately), means that the weights given to the observations K, 2K, 3K, ..., mK ticks in the past, are factors of $e = 2.7183\ldots, e^2, e^3, \ldots, e^M$, respectively, smaller than that assigned to the most recent observation. The information can be converted into time units by multiplying K by the average time interval between ticks if delay=0, or by delay if delay is greater than this interval.

RTPRICEVOL assumes that the drift is zero. (This is a good approximation in real-time environments.) If the drift is non-zero, RTPRICEVOL estimates instead the root-mean-square (RMS) of price returns; in this case when the drift is known, the price volatility can instead be estimated by the formula:

$$\sqrt{RTPRICEVOL^2 - \text{drift}^2}$$

Setting a low limit will depress the average value of RTPRICEVOL. Try some examples using the TICKER and chart the results to learn more.

EXAMPLES

If cell A1 contains a real-time data item with the values:

| Value | Arrival time (sec.) |
|---|---|
| 10 | 0 |
| 9.98 | 1 |
| 9.99 | 4 |
| 10.1 | 8 |
| 10.08 | 9 |
| RTPRICEVOL(0, A1, 0.2, 0.999) equals 0.5162 | |

RTSIGN

Returns the sign (−1,0,1) of the difference between the current value of a real-time variable and its prior value.

Syntax

RTSIGN(filter_num, rt_data_item, delay)

filter_num is a number specifying the filter number and is an integer between 0 and 255, inclusive. The filter number uniquely identifies a global memory location where the function stores cumulative results and must be different for each FEA Real-Time Filterpak function usage, even if the functions are contained in the same cell, refer to the same rt_data_item, or are in different open spreadsheet files. filter_num should be a constant. If the filter number is changed, new global data is referenced.

rt_data_item is a reference to a cell containing a numeric real-time data item.

delay is the minimum required latency in seconds since the prior arrival of rt_data_item. If delay is zero or less, then no minimum latency is required. If delay is positive, then at least an integral number of seconds not less than delay must have passed for the new difference to be returned, otherwise the prior value will be returned. If delay is omitted then zero is used.

Remarks

Latency is used in calculations if delay is positive.

filter_num is truncated to an integer.

delay is rounded up to the nearest integer.

A result of −1 means rt_data_item has declined since its previous value, a result of 1 means it has increased, a result of 0 (zero) means there has been no change.

When rt_data_item is updated with a new value, RTSIGN returns the sign of the difference between that new value and its prior value. However, if fewer than delay seconds have passed since the last rt_data_item update, no action occurs; in fact any number of such new updates may occur within the minimum delay period and all will be ignored, so RTSIGN will not change. The first update which occurs after the minimum delay period has passed will be differenced with the value which was seen at least delay seconds ago, and the sign of this difference is returned by the function. If no minimum delay time is desired, delay should be set to zero. In this case, RTSIGN will return the signs of the differences of all successive rt_data_item values.

You can cascade RTSIGN to find second, third, and higher-order differences. Be sure to use a separate filter number for each.

This function behaves the same as RTDIFF but returns the sign of the difference of real-time updates instead of the sign and magnitude of the difference.

EXAMPLES

If cell A1 contains a real-time data item with the values:

| Value | Arrival time (sec.) |
|---|---|
| 10 | 0 |
| 9 | 1 |
| 11 | 4 |
| 12 | 8 |
| 11 | 9 |
| RTSIGN(0, A1, 0) equals −1 (sign of 11-12) | |
| RTSIGN(1, A1, 3) equals 0 (sign of 11-11) | |
| RTSIGN(2, A1, 6) equals 1 (sign of 11-9) | |

RTSMOOTH

Returns the exponentially-weighted moving average of a real-time variable.

Syntax

RTSMOOTH(filter_num, rt_data_item, decay_factor, initial_value)

filter_num is a number specifying the filter number and is an integer between 0 and 255, inclusive. The filter number uniquely identifies a global memory location where the function stores cumulative results and must be different for each FEA Real-Time Filterpak function usage, even if the functions are contained in the same cell, refer to the same rt_data_item, or are in different open spreadsheet files. filter_num should be a constant. If the filter number is changed, new global data is referenced.

rt_data_item is a reference to a cell containing a numeric real-time data item.

decay_factor is a number specifying the decay factor and is a number between greater than or equal to zero and strictly less than one. Higher values give more weight to prior observations. The decay factor is commonly called lambda ($\lambda$).

initial_value is a number specifying the initial value of the exponentially-weighted moving average y(0). It is used before the first invocation of the function occurs. If initial_value is omitted then the first value of rt_data_item is used.

Remarks

Latency is not used in calculations.

filter_num is truncated to an integer.

If decay_factor<0 or decay_factor>=1, RTSMOOTH returns an error value.

In a simple moving average the weight applied to each point is equal to 1/N where N is the sample size. In exponential smoothing relatively more weight is applied to recent observations. The weight applied to each point is determined by decay_factor.

The exponentially-weighted moving average y(n) is calculated iteratively by:

$$y_n = \lambda y_{n-1} + (1-\lambda)x_n$$

where $\lambda$ is decay_factor and initial_value is the initial value y(0).

Higher values of decay_factor give more weight to prior observations. More precisely, set K=−1/log(decay_factor).

K is the approximate number of price observations, or ticks, in the past beyond which the weights start to become negligible. For instance, decay_factor=0.90 gives K=9 (approximately), means that the weights given to the observations K, 2K, 3K, . . . , mK ticks in the past, are factors of e=2.7183 . . . , e^2, e^3, . . . , e^m, respectively, smaller than that assigned to the most recent observation. The information can be converted into time units by multiplying K by the average time interval between ticks if delay=0, or by delay if delay is greater than this interval.

EXAMPLES

If cell A1 contains a real-time data item with the values:

| Value | Arrival time (sec.) |
|-------|---------------------|
| 10 | 0 |
| 9 | 1 |
| 11 | 4 |
| 12 | 8 |
| 11 | 9 |
| RTSMOOTH(0, A1, 0.94, 10) equals 10.176 | |

RTSTDEV

Returns the sample standard deviation of a real-time variable.

Syntax

RTSTDEV(filter_num, rt_data_item)

filter_num is a number specifying the filter number and is an integer between 0 and 255, inclusive. The filter number uniquely identifies a global memory location where the function stores cumulative results and must be different for each FEA Real-Time Filterpak function usage, even if the functions are contained in the same cell, refer to the same rt_data_item, or are in different open spreadsheet files. filter_num should be a constant. If the filter number is changed, new global data is referenced.

rt_data_item is a reference to a cell containing a numeric real-time data item.

Remarks

Latency is not used in calculations.

filter_num is truncated to an integer.

The equation for the sample standard deviation is:

$$s = \sqrt{\frac{n\left(\sum_{i=1}^{n} x_i^2\right) - \left(\sum_{i=1}^{n} x_i\right)^2}{n(n-1)}}$$

If rt_data_item is log-normally distributed (e.g., the price of a certain securities), then s approaches infinity as n becomes large; use RTPRICEVOL instead.

EXAMPLES

If cell A1 contains a real-time data item with the values:

| Value | Arrival time (sec.) |
|-------|---------------------|
| 10 | 0 |
| 9 | 1 |
| 11 | 4 |
| 12 | 8 |
| 11 | 9 |
| RTSTDEV(0, A1) equals 1.140175 | |

RTSTDEVT

Returns the time-weighted standard deviation of a real-time variable.

Syntax

RTSTDEVT(filter_num, rt_data_item, initial_value, initial_time)

filter_num is a number specifying the filter number and is an integer between 0 and 255, inclusive. The filter number uniquely identifies a global memory location where the function stores cumulative results and must be different for each FEA Real-Time Filterpak function usage, even if the functions are contained in the same cell, refer to the same rt_data_item, or are in different open spreadsheet files. filter_num should be a constant. If the filter number is changed, new global data is referenced.

rt_data_item is a reference to a cell containing a numeric real-time data item.

initial_value is a number specifying the prior value of the time-weighted sample standard deviation, i.e., before the first invocation of the function. If initial_value is omitted then no prior value is used.

initial_time is a number specifying the time period in seconds over which initial_value was evaluated. This becomes the weight in the subsequent time-weighted average. If initial_time is omitted or 0 (zero) then no initial value is used.

Remarks

Latency is used in calculations.

filter_num is truncated to an integer.

Specify initial_value and initial_time to include a previously observed sample standard deviation or influential observation in the results.

The equation for the time-weighted standard deviation is:

$$s_{tw} = \sqrt{\overline{(X_{tw}^2)} - \overline{(X_{tw})}^2}$$

where X(tw) is the time-weighted arithmetic mean calculated using the equation shown in RTAVERAGET.

RTSTDEVT returns the population standard deviation, to convert to the sample standard deviation multiply by the square root of n/(n−1), where n is the number of observations. Note that this correction factor rapidly approaches one as n increases, so the difference between the population and sample standard deviation is usually trivial.

EXAMPLES

If cell A1 contains a real-time data item with the values:

| Value | Arrival time (sec.) |
|-------|---------------------|
| 10 | 0 |
| 9 | 1 |
| 11 | 4 |
| 12 | 8 |
| 11 | 9 |
| RTSTDEVT(0, A1) equals 1.0541 | |

RTSUM

Returns the sum of values of a real-time variable.

Syntax

RTSUM(filter_num, rt_data_item)

filter_num is a number specifying the filter number and is an integer between 0 and 255, inclusive. The filter number uniquely identifies a global memory location where the function stores cumulative results and must be different for each FEA Real-Time Filterpak function usage, even if the functions are contained in the same cell, refer to the same rt_data_item, or are in different open spreadsheet files. filter_num should be a constant. If the filter number is changed, new global data is referenced.

rt_data_item is a reference to a cell containing a numeric real-time data item.

Remarks

Latency is not used in calculations.

filter_num is truncated to an integer.

EXAMPLES

If cell A1 contains a real-time data item with the values:

| Value | Arrival time (sec.) |
|---|---|
| 10 | 0 |
| 9 | 1 |
| 11 | 4 |
| 12 | 8 |
| 11 | 9 |
| RTSUM(0, A1) equals 53 | |

RTTAPE

Returns an array of real-time variable values and corresponding update times.

Syntax

RTTAPE(tape_num, rt_data_item)

tape_num is a number specifying the tape number and is an integer between 0 and 15, inclusive. The tape number uniquely identifies a global memory location where the function stores cumulative results and must be different for each RTTAPE function usage, even if the functions refer to the same rt_data_item or are in different open spreadsheet files. tape_num should be a constant. If you change this value after the function has been invoked then all previous results are lost and new results are generated. The value of tape_num is independent of the value of filter_num in the FEA Real-Time Filterpak filter functions; for example, if you specify a tape_num value of 0 in an RTTAPE function call then you can still specify a filter_num value of 0 in a filter function since they represent different memory locations.

rt_data_item is a reference to a cell containing a numeric real-time data item.

Remarks

Formulas that return arrays must be entered as array formulas. For information about arrays, see *About Spreadsheet Functions* or your spreadsheet's User's Guide or on-line help.

You may enter RTTAPE as a vertical or horizontal array. A vertical array has up to 256 rows and either one or two columns. A horizontal array has up to 256 columns and either one or two rows.

In a vertical array, the most recent rt_data_item value is printed in the top-most row. As new rt_data_item values occur, the previous values are scrolled downward to the last row and, finally, "off the edge" of the array. In a horizontal array, the most recent value is printed in the left-most column and scrolls rightward.

In a n-by-1 vertical array, the column contains scrolling rt_data_item values. In a n-by-2 vertical array the left column contains update times in the spreadsheet's date/time serial number format and the right column contains scrolling rt_data_item values. In a 1-by-n horizontal array, the row contains scrolling rt_data_item values. In a 2-by-n horizontal array, the top row contains update times in the spreadsheet's date/time serial number format and the bottom row contains scrolling rt_data_item values. Any 2-by-2 or smaller array is treated as a vertical array.

Microsoft Excel for Windows represents dates as serial numbers where 1 corresponds to Jan. 1, 1900. Numbers to the right of the decimal point represent the time as a decimal fraction ranging from 0 to 0.99999999, representing the times from 0:00:00 (12:00:00 AM) to 23:59:59 (11:59:59 PM). You can find the current data/time with the Microsoft Excel's NOW function. To display date/time serial numbers as date/time values, select the cells you want to format, choose Cells (Format menu), select the Number tab, select the Time category, and then select the desired format type.

EXAMPLES

If cell A1 contains a real-time data item with the values:

| Value | Arrival time |
|---|---|
| 10 | 10:45:00 |
| 9 | 10:45:01 |
| 11 | 10:45:04 |
| 12 | 10:45:08 |
| 11 | 10:45:09 |

When entered as an array formula in cells A3:B7, RTTAPE(0,A1) returns:

| | A | B |
|---|---|---|
| 1 | 11 | |
| 2 | | |
| 3 | 10:45:00 | 10 |
| 4 | 10:45:01 | 9 |
| 5 | 10:45:04 | 11 |
| 6 | 10:45:08 | 12 |
| 7 | 10:45:09 | 11 |

Note: Cells A3:A7 are formatted "h:mm:ss" (use the Format-Cells-Number command). The actual values in these cells are Microsoft Excel data/time serial numbers (described above).

RTTRIM

Returns the trimmed values of a real-time variable. The trimmed values are the interior of a data set calculated by excluding data points below some lower limit and above some upper limit. Use this function when you wish to exclude outlying data from your analysis.

Syntax

RTTRIM(filter_num, rt_data_item, lower_limit, upper_limit, limit_type)

filter_num is a number specifying the filter number and is an integer between 0 and 255, inclusive. The filter number uniquely identifies a global memory location where the function stores cumulative results and must be different for each FEA Real-Time Filterpak function usage, even if the functions are contained in the same cell, refer to the same rt_data_item, or are in different open spreadsheet files. filter_num should be a constant. If the filter number is changed, new global data is referenced.

rt_data_item is a reference to a cell containing a numeric real-time data item.

lower_limit is a number specifying the lower limit for trimming rt_data_item values. Use limit_type to specify absolute limits, percentage movements, or absolute movements. If limit_type is 1 then enter a percentage as a decimal number, e.g., for 5%, enter 0.05. If this argument is omitted then no lower limit is used.

upper_limit is a number specifying the upper limit for trimming rt_data_item values. Use limit_type to specify absolute limits, percentage movements, or absolute movements. If limit_type is 1 then enter a percentage as a decimal number, e.g., for 5%, enter 0.05.

limit_type is a number specifying if lower_limit and upper_limit represent absolute limits or percentage movements.

| limit_type | Trimmed rt_data_item values |
|---|---|
| 0 or omitted | Absolute limits: Trims current rt_data_item values that do not fall between lower_limit and upper_limit, inclusive. |
| 1 | Percentage movements: Trims current rt_data_item values that do not fall between previous rt_data_item * (1 - lower_limit) and previous rt_data_item * (1 + upper_limit), inclusive. |
| 2 | Absolute movements: Trims current rt_data_item values that do not fall between previous rt_data_item - lower_limit and previous rt_data_item + upper_limit, inclusive. |

Remarks

Latency is not used in calculations.

filter_num and limit_type are truncated to integers.

The following bounds for lower_limit and upper_limit must be observed or an error value is returned:

| limit_type | lower_limit | upper_limit |
|---|---|---|
| 0 | no minimum | >lower_limit |
| 1 | >= 0 | >= 0 |
| 2 | >= 0 | >= 0 |

When an rt_data_item value is trimmed, RTTRIM returns the limiting value. The limiting value is determined by limit_type and either lower_limit or upper_limit. For example, say you have set limit type to 0 (absolute limits) and upper_limit to 10, if the rt_data_item value 12 occurs then the (upper) limiting value 10 is returned.

When determining if a real-time value should be trimmed using limit_type methods 1 or 2, RTTRIM always compares the current value of rt_data_item to the previous—possibly trimmed—value of rt_data_item returned by RTTRIM.

EXAMPLES

If cell A1 contains a real-time data item with the values:

| Value | Arrival time (sec.) |
|---|---|
| 10 | 0 |
| 9 | 1 |
| 11 | 4 |
| 12 | 8 |
| 11 | 9 |
| RTTRIM(0, A1, 9.5, 11.5, 0) returns 10, 9.5, 11, 11.5, 11 | |
| RTTRIM(1, A1, 0.1, 0.1, 1) returns 10, 9, 9.9, 10.89, 11 | |
| RTTRIM(2, A1, 1.5, 1.5, 2) returns 10, 9, 10.5, 12, 11 | |

RTVERSION

Returns the version of the current FEA Real-Time Filterpak add-in, as text.

Syntax

RTVERSION()

Remarks

If the FEA Real-Time Filterpak add-in is not loaded then RTVERSION returns the #NAME? error value.

EXAMPLES

If you are using version 1.0 of FEA Real-Time Filterpak, then: RTVERSION() equals "v. 1.0"

If you have not loaded the FEA Real-Time Filterpak add-in, then: RTVERSION() returns the #NAME? error value TICKER Utility The TICKER utility is a Microsoft Windows program that generates a series of simulated real-time prices based on user-specified parameters. The prices are log normally distributed and the arrival times of those prices are exponentially distributed. The output items is available to any application that supports dynamic data exchange (DDE).

Microsoft Windows

1. Start TICKER by double-clicking the TICKER icon in the FEA Real-Time Filterpak program group.

2. Specify the following input parameters for the price series:

| Parameter | Description |
|---|---|
| Initial price | The starting price. |
| Volatility | The volatility of the price series as a percent, e.g., for 20%, enter 20. |
| Drift | The drift rate of the price series as a percent, e.g., for 20%, enter 20. |
| Average delay | The average inter-arrival time between prices in seconds. It is used as the inter-arrival parameter in the exponential distribution. |
| Constant delay | Set the inter-arrival time between ticks to a constant number of seconds (specified by Average delay) instead of an exponentially distributed inter-arrival time. |
| Randomize seed | Use the system clock to set the seed used to create unique pseudo-random number sequences. If Randomize seed is not set, TICKER's internal random number functions use the same number as a seed the first time they are called, and thereafter use the last generated number as a seed value. (The seed is an initial value used to generate pseudo-random numbers.) |

3. Click Start to start generating prices.

The PRICE item changes from red to green to indicate that prices are being generated. The following items are generated:

| Item | Description |
|---|---|
| PRICE | Most recent price generated. |
| TICKS | Number of times PRICE has updated. |
| UPDATETIME | Date and time PRICE was last updated. |
| ELASPEDTIME | Number of seconds elapsed since the first PRICE was generated. |
| TICKINTERVAL | Number of seconds between the current PRICE tick and the next. |

4. To enter a DDE link from TICKER into Microsoft Excel, activate Excel, choose a cell, and then enter the remote reference formula "=TICKER|TICK!PRICE" (without the quotes). You'll see the value in the cell update as TICKER generates new prices. You can set the formula item to any of the TICKER output items, not just PRICE. For example, "=TICKER|TICK!UPDATETIME" returns the time PRICE was last updated.

5. Click Stop to halt ticks or Reset to halt ticks and reset the output stream.

6. Click Exit or press ESCAPE to quit.

Remarks

TICKER implements a stationary random number generation process.

TICKER is a Microsoft Visual Basic 3.0 executable file. To run TICKER, the run-time file VBRUN300.DLL must be in \WINDOWS\SYSTEM or a directory on your path.

VBRUN300.DLL is included with the FEA Real-Time Filterpak distribution.

Tip: You can generate multiple real-time price series by starting several sessions of TICKER and changing the DDE topic of each session. To change TICKER's DDE topic, double-click the "DDE Topic" label and enter a new DDE topic.

Answers to Common Questions

Q: When I run TICKER and graph RTAVERAGE and RTSMOOTH, RTAVERAGE always seems to give a "flatter" graph, no matter what real-time data item is involved. Why?

A: RTAVERAGE gives equal weight to all past observations. It therefore "remembers" all past values. RTSMOOTH puts relatively more weight on recent past values and gradually "forgets" values in the distant past. Since TICKER is a stationary source of values (most markets are instead dynamic), the RTAVERAGE settles down to a flat graph.

Q: The RTPRICEDRIFT numbers seem to be enormous—I get drifts like 100, 200, or −150. Why?

A: An RTPRICEDRIFT value of 50 actually means 5000% (percent) so, yes, the numbers can be large. RTPRICEDRIFT examines the annualized rate of appreciation (or depreciation), and remember that the latencies are very small for most price ticks, usually just seconds. What a value of 50 is saying, is that if all future ticks shared the measured characteristics of past ticks, 5000% return would be realized over a year's time. Usually such large values are just "noise," since it is widely believed that random walk theory applies, and so the true drift values are generally close to the short-term interest rate. It is a good idea to use a large value for the smoothing parameter, say decay__ factor=0.995, so that the drift is averaged over many ticks.

I claim:

1. A computer executable spreadsheet application for processing a plurality of time dependent data values generated by a real time data source external to the spreadsheet application, the spreadsheet application executable by a processor of a computer system having a memory, the spreadsheet application comprising:

a tape function, executable by the processor, that receives the plurality of data values in order individually over time from the real time data source; and, a tape data structure, stored in the memory and globally accessible from and independent of, any cell of the spreadsheet application, that stores each of the plurality of data values in the order received by the tape function.

2. The spreadsheet application of claim 1, wherein:

the tape data structure stores a predetermined number N of data values; and, for each currently received data value, the tape data function removes an $N^{th}$ oldest data value from the tape data structure, and stores the currently received data value to the tape data structure.

3. The spreadsheet application of claim 1, wherein each data value is associated with a time value, and the tape data structure stores the time value in association with the data value.

4. The spreadsheet application of claim 1, wherein each time is associated with a time value, the real time data source provides a plurality of data values at each time value, and the tape data structure stores in association with each time value the plurality of data value received at the time value.

5. The spreadsheet application of claim 1, further comprising:

a plurality of tape data structures, each tape data structure referenced by a unique tape number; and the tape function includes an interface for specifying the tape number of the tape data structure to receive the plurality of data values from the real time data source.

6. A computer executable spreadsheet application for processing time dependent data values generated by a real time data source external to the spreadsheet application, the spreadsheet application executable by a processor of a computer system having a memory, the spreadsheet application comprising:

a tape data structure, stored in the memory and globally accessible from, and independent of, any cell of the spreadsheet application, and having N ordered storage locations $S_1$ to $S_N$ for a predetermined value of N for storing an ordered, predetermined number of data values; and a tape function, executable by the processor, that receives a plurality of data values individually over time from the real time data source and stores each existing data value in the tape data structure in a storage location $S_j$ to a storage location $S_{j+1}$ for $1 \leq j \leq N-1$, and stores a currently received data value to storage location $S_1$.

7. A computer executable spreadsheet application for processing time dependent data values generated by a real time data source external to the spreadsheet application, the spreadsheet application executable by a processor of a computer system having a memory, the spreadsheet application comprising:

a filter function, executable by the processor, that receives a plurality of data values individually over time from the real time data source and computes a current filter output based on a currently received data value, and a previously computed filter output stored in a filter data structure; and a filter data structure, stored in the memory and globally accessible from, and independent of, any cell of the spreadsheet application, that receives the filter output from the filter function and stores the filter output.

8. The spreadsheet application of claim 7, wherein the filter data structure further stores filter specific auxiliary data for computing the filter output.

9. The spreadsheet application of claim 7, wherein the filter function is selected from a group consisting of:

a volatility function;

a smoothing function;

a maximum value function;

a minimum value function;

an autoregressive conditional heteroscedaskicity function;

a generalized autoregressive conditional heteroscedaskicity function;

a Kalman filter function;

a sign function;

a standard deviation function;

a time weighted standard deviation function;

a trim function;

a direction drift function; and a weighted average function.

10. The spreadsheet application of claim 7, further comprising:

a plurality of filter data structures, each filter data structure having a unique filter number; and the filter function includes an interface for specifying the filter number of the filter data structure to receive and store the filter output.

11. The spreadsheet application of claim 7, wherein:

there are a plurality of filter functions, each filter function computing a different filter output, and associated with a predetermined set of data types used to compute the filter output; and each filter data structure comprises a union of the data types for all of the filter functions.

12. A computer executable spreadsheet application for processing time dependent data values generated by a real time data source external to the spreadsheet application, the spreadsheet application having a plurality of user-editable cells, and executable by a processor of a computer system having a memory, the spreadsheet application comprising:

a plurality of filter functions, each invokable from within any cell of the spreadsheet application and executable by the processor in response to an input of data values from the real time data source, each filter function having an interface that specifies:

a filter number of a filter data structure for storing data used or computed by the filter function;

zero or more parameters for modifying computation of the filter function;

a reference to the real time data source from which the filter function receives a plurality of data values individually over time;

each filter function for computing a current filter output based on a currently received data value from the real time data source, and a previously computed filter output stored in the filter data structure specified by the filter number; and, a plurality of filter data structures stored in the memory and globally accessible from, and independent of, any cell of the spreadsheet application, each filter data structure having a filter number for being referenced within the interface of a filter function, each filter data structure storing the filter output from a filter function.

13. A computer implemented method of processing in a spreadsheet application, time dependent data values generated by a real time data source external to the spreadsheet application, the spreadsheet application including a spreadsheet having a plurality of cells, and executable by a processor of a computer system having a memory, the method comprising:

storing in the memory a data structure globally accessible from, and independent of, any cell of the spreadsheet application for storing an ordered, predetermined number of data values;

receiving into a cell of spreadsheet each of a plurality of data values in order over time from the real time data source;

storing each data value as it is received in the cell to the data structure; and removing from the data structure each time a data value is stored, a least recently received data value in excess of the predetermined number of data values.

14. A computer implemented method of processing in a spreadsheet application, time dependent data values generated by a real time data source external to the spreadsheet application, the spreadsheet application including a spreadsheet having a plurality of cells and executable by a processor of a computer system having a memory, the method comprising:

storing in the memory a data structure globally accessible from, and independent of, any cell of the spreadsheet application for storing computed data values;

receiving into a cell of the spreadsheet each of a plurality of data values in order over time from the real time data source;

computing a current filter output of a filter function based on:

a currently received data value from the real time data source; and a previously computed output of the filter function based on a previously received data values; and storing the current filter output in the data structure.

15. A computer implemented method of processing in a spreadsheet application, time dependent data values generated by a real time data source external to the spreadsheet application, the spreadsheet application including a spreadsheet having a plurality of cells and executable by a processor of a computer system having a memory, the method comprising:

storing in memory a data structure, globally accessible from, and independent of, any cell of the spreadsheet application, and having N ordered storage locations $S_1$ to $S_N$ for a predetermined value of N for storing an ordered, predetermined number of data values;

receiving into a cell of spreadsheet each of a plurality of data values in order over time from the real time data source;

for each data value in a storage location $S_j$, storing the data value to a storage location $S_{j+1}$ for $1 \leq j \leq N-1$; and storing each data value as it is received from the real time data source to a storage location $S_1$ of the data structure.

16. A computer executable spreadsheet application for processing time dependent data values generated by a real time data source external to the spreadsheet application, the spreadsheet application executable by a processor of a computer system having a memory, the spreadsheet application comprising:

a function, executable by the processor, that receives a plurality of data values individually over time from the real time data source, and returns either a single value derived from the plurality of data values or an array of data values; and a data structure, stored in the memory, and globally accessible from and independent of, any cell of the spreadsheet application, that receives from the function the single value or the array of data values.

* * * * *